US012810835B2

(12) United States Patent
Zheng et al.

(10) Patent No.: US 12,810,835 B2
(45) Date of Patent: Nov. 24, 2026

(54) OPEN WEARABLE ACOUSTIC DEVICE AND ACTIVE NOISE REDUCTION METHOD

(71) Applicant: Shenzhen Shokz Co., Ltd., Shenzhen (CN)

(72) Inventors: Jinbo Zheng, Shenzhen (CN); Chengqian Zhang, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 86 days.

(21) Appl. No.: 18/910,944

(22) Filed: Oct. 9, 2024

(65) Prior Publication Data

US 2025/0037695 A1 Jan. 30, 2025

Related U.S. Application Data

(63) Continuation of application No. PCT/CN2022/137196, filed on Dec. 7, 2022.

(51) Int. Cl.
*G10K 11/178* (2006.01)

(52) U.S. Cl.
CPC .. *G10K 11/17823* (2018.01); *G10K 11/17825* (2018.01); *G10K 11/17881* (2018.01); *G10K 2210/1081* (2013.01); *G10K 2210/3026* (2013.01); *G10K 2210/3027* (2013.01); *G10K 2210/3028* (2013.01);
(Continued)

(58) Field of Classification Search
CPC .... H04R 1/1083; H04R 1/105; H04R 1/1091; H04R 29/00; H04R 2460/01; G10K 11/1713; G10K 11/17881; G10K 2210/1081
USPC ............................................. 381/71.1, 71.6
See application file for complete search history.

(56) References Cited

U.S. PATENT DOCUMENTS 5,732,143 A 3/1998 Andrea et al.
8,515,080 B2 * 8/2013 DeCusatis ................ H04L 9/32 380/282
11,386,881 B2 * 7/2022 Kannan ............ G10K 11/17813
2009/0034748 A1 * 2/2009 Sibbald ............ G10K 11/17885 381/71.6

(Continued)

FOREIGN PATENT DOCUMENTS

CN 106162410 A 11/2016
CN 108882092 A 11/2018

(Continued)

OTHER PUBLICATIONS

International Search Report (Jun. 20, 2023).

*Primary Examiner* — William J Deane, Jr.
(74) *Attorney, Agent, or Firm* — Fideli Law PLLC; Qiang Li

(57) ABSTRACT

An open wearable acoustic device and an active noise reduction method are provided. The acoustic device includes a first sound sensor module, a speaker, and a noise reduction circuit. The noise reduction circuit may obtain a first sound signal from the first sound sensor module, select a target noise reduction mode from a plurality of noise reduction modes based on the first sound signal, and execute the target noise reduction mode. This solution can adaptively adjust a noise reduction mode based on a noise condition of an external environment of the acoustic device, so that an active noise reduction process of the acoustic device is more in line with the noise condition of a current environment, thereby improving a noise reduction effect of the acoustic device.

20 Claims, 10 Drawing Sheets

(52) U.S. Cl.
CPC ................ *G10K 2210/3036* (2013.01); *G10K 2210/3056* (2013.01); *G10K 2210/511* (2013.01)

(56) References Cited

U.S. PATENT DOCUMENTS

| | | | | |
|---|---|---|---|---|
| 2012/0101819 | A1* | 4/2012 | Heiman | H04R 5/04 381/74 |
| 2016/0196819 | A1 | 7/2016 | Wurtz | |
| 2016/0300562 | A1* | 10/2016 | Goldstein | G10K 11/17879 |
| 2018/0122357 | A1* | 5/2018 | Thornock | G10K 11/178 |
| 2018/0146385 | A1* | 5/2018 | Aldana | H04W 72/20 |
| 2020/0236466 | A1* | 7/2020 | Zhao | H04R 1/1041 |
| 2020/0245057 | A1 | 7/2020 | Igarashi et al. | |
| 2022/0076656 | A1* | 3/2022 | He | G10K 11/17817 |

FOREIGN PATENT DOCUMENTS

| | | | |
|---|---|---|---|
| CN | 110049403 | A | 7/2019 |
| CN | 111836147 | A | 10/2020 |
| EP | 2915337 | B1 | 5/2016 |
| EP | 3644307 | A1 | 4/2020 |
| EP | 3886085 | A1 | 9/2021 |
| JP | 2002501623 | A | 1/2002 |
| JP | 2008301376 | A | 12/2008 |
| JP | 2019519819 | A | 7/2019 |
| JP | 2020190642 | A | 11/2020 |
| JP | 2021061629 | A | 4/2021 |
| JP | 7031668 | B2 | 3/2022 |
| WO | 2019003525 | A1 | 1/2019 |
| WO | 2020193937 | A1 | 10/2020 |
| WO | 2021089987 | A1 | 5/2021 |

* cited by examiner

OPEN WEARABLE ACOUSTIC DEVICE AND ACTIVE NOISE REDUCTION METHOD

RELATED APPLICATIONS

This application is a continuation application of PCT application No. PCT/CN2022/137196, filed on Dec. 7, 2022, and the content of which is incorporated herein by reference in its entirety.

TECHNICAL FIELD

The present disclosure relates to the field of audio technologies, and in particular, to an open wearable acoustic device and an active noise reduction method.

BACKGROUND

Nowadays, wearable devices (for example, headphones) with acoustic output functions are used by more and more users. In particular, a listening mode in which an acoustic device does not form a closed space with a human body (that is, an open-ear listening mode, for example, there is no need to insert the acoustic device into an ear canal or cover an ear, or a sound transmission hole is provided on a surface of the acoustic device, so that an open space is formed between an eardrum and the acoustic device) is increasingly used in wearable acoustic devices due to its characteristics of comfort, safety, and the like. This type of wearable acoustic device is referred to as an open wearable device.

When the open wearable acoustic device is worn on a user's head, the open wearable acoustic device does not form a closed space with the user's eardrum. Therefore, in comparison with a closed acoustic device (such as an in-ear headphone), more sounds emitted by noise sources outside an ear enter the ear. Consequently, when wearing the open acoustic device, the user can hear more ambient noise, and this reduces auditory experience of the user. Therefore, an active noise reduction design based on an open wearable acoustic device needs to be provided.

SUMMARY

The present disclosure provides an open wearable acoustic device and an active noise reduction method to improve an effect of active noise reduction.

According to a first aspect, the present disclosure provides an open wearable acoustic device, including a support member, a speaker, a first sound sensor module, and a noise reduction circuit. The speaker is physically connected to the support member, and an open space is formed between the speaker and a user's eardrum when the acoustic device is worn on the user's head; the first sound sensor module is physically connected to the support member, and configured to capture a first sound and generate a first sound signal, where the first sound signal includes an ambient noise signal of ambient noise and a leakage signal from the speaker; and the noise reduction circuit is configured to: obtain the first sound signal from the first sound sensor module, generate a quasi-ambient noise signal by reducing components of the leakage signal in the first sound signal, generate a first noise cancellation signal based on the quasi-ambient noise signal, and send the first noise cancellation signal to the speaker, so that the speaker converts the first noise cancellation signal into a first noise cancellation audio to reduce volume of ambient noise at the eardrum.

In some exemplary embodiments, the first sound sensor module is farther away from the eardrum than the speaker, and a phase of the ambient noise reaching the first sound sensor module is ahead of a phase of the ambient noise reaching a sound output end of the speaker.

In some exemplary embodiments, to generate the quasi-ambient noise signal, the noise reduction circuit obtains an input signal corresponding to the speaker; provides a first gain for the input signal to obtain a first gain signal, where the first gain is a transfer function from the speaker to the first sound sensor module; and obtains the first sound signal from the first sound sensor module, and subtracts the first gain signal from the first sound signal to obtain the quasi-ambient noise signal.

In some exemplary embodiments, the noise reduction circuit is further configured to: send a test audio signal to the speaker, so that the speaker emits a corresponding test audio and that the test audio is captured by the first sound sensor module; obtain a capture audio signal captured by the first sound sensor module; and determine the transfer function based on the test audio signal and the capture audio signal.

In some exemplary embodiments, the noise reduction circuit includes a feedforward filter, and to generate the first noise cancellation signal, the noise reduction circuit inputs the quasi-ambient noise signal into the feedforward filter, and filters the quasi-ambient noise signal by using the feedforward filter, to obtain the first noise cancellation signal, where the feedforward filter is configured to adjust at least one of a gain or phase of the quasi-ambient noise signal, so that the obtained first noise cancellation signal can cancel at least a part of the ambient noise at the eardrum.

In some exemplary embodiments, a distance between the first sound sensor module and an acoustic null point of the speaker is within a preset non-zero range.

In some exemplary embodiments, the acoustic device further includes a second sound sensor module physically connected to the support member, and configured to capture a second sound and generate a second sound signal, where the noise reduction circuit is further configured to: obtain the second sound signal from the second sound sensor module, generate a second noise cancellation signal based on the second sound signal, and send the second noise cancellation signal to the speaker, so that the speaker converts the second noise cancellation signal into a second noise cancellation audio to further reduce the volume of the ambient noise at the eardrum.

In some exemplary embodiments, the second sound sensor module is closer to the eardrum than the speaker, and a phase of the ambient noise reaching the second sound sensor module is behind a phase of the ambient noise reaching a sound output end of the speaker.

In some exemplary embodiments, to send the first noise cancellation signal and the second noise cancellation signal to the speaker, the noise reduction circuit combines the first noise cancellation signal and the second noise cancellation signal to obtain a combined noise cancellation signal; and sends the combined noise cancellation signal to the speaker.

In some exemplary embodiments, the noise reduction circuit includes a feedback filter, and to generate the second noise cancellation signal, the noise reduction circuit inputs the second sound signal into the feedback filter; and filters the second sound signal by using the feedback filter, to obtain the second noise cancellation signal, where the feedback filter is configured to adjust at least one of a gain or phase of the second sound signal, so that the obtained second noise cancellation can cancel at least a part of the ambient noise at the eardrum.

In some exemplary embodiments, the noise reduction circuit includes at least one storage medium and at least one processor. The storage medium stores at least one instruction set, configured to reduce noise; and the processor is in communication with the speaker, the first sound sensor module, and the at least one storage medium. When the acoustic device runs, the at least one processor reads the at least one instruction set, and performs the following as instructed by the at least one instruction set: obtaining the first sound signal from the first sound sensor, generating the quasi-ambient noise signal by reducing the components of the leakage signal in the first sound signal, generating the first noise cancellation signal based on the quasi-ambient noise signal, and sending the first noise cancellation signal to the speaker, so that the speaker converts the first noise cancellation signal into the first noise cancellation audio to reduce the volume of the ambient noise at the eardrum.

In some exemplary embodiments, the acoustic device is one of an headphone, a muffler, a hearing aid, and acoustic glasses.

According to a second aspect, the present disclosure further provides an active noise reduction method, applied to the open wearable acoustic device according to the first aspect. The method includes: by using the noise reduction circuit, obtaining the first sound signal from the first sound sensor module; generating the quasi-ambient noise signal by reducing the components of the leakage signal in the first sound signal; generating the first noise cancellation signal based on the quasi-ambient noise signal; and sending the first noise cancellation signal to the speaker, so that the speaker converts the first noise cancellation signal into the first noise cancellation audio to reduce the volume of the ambient noise at the eardrum.

In some exemplary embodiments, a phase of the ambient noise measured by the first sound sensor module is ahead of a phase of the ambient noise reaching a sound output end of the speaker.

In some exemplary embodiments, the generating of the quasi-ambient noise signal by reducing the components of the leakage signal in the first sound signal includes: obtaining an input signal corresponding to the speaker; providing a first gain for the input signal to obtain a first gain signal, where the first gain is a transfer function from the speaker to the first sound sensor module; and obtaining the first sound signal from the first sound sensor module, and subtracting the first gain signal from the first sound signal to obtain the quasi-ambient noise signal.

In some exemplary embodiments, the method further includes: by using the noise reduction circuit, sending a test audio signal to the speaker, so that the speaker emits a corresponding test audio and that the test audio is captured by the first sound sensor module; obtaining a capture audio signal captured by the first sound sensor module; and determining the transfer function based on the test audio signal and the capture audio signal.

In some exemplary embodiments, the noise reduction circuit includes a feedforward filter; and the generating of the first noise cancellation signal based on the quasi-ambient noise signal includes: inputting the quasi-ambient noise signal into the feedforward filter, and filtering the quasi-ambient noise signal by using the feedforward filter, to obtain the first noise cancellation signal, where the feedforward filter is configured to adjust at least one of a gain or phase of the quasi-ambient noise signal, so that the obtained first noise cancellation signal can cancel at least a part of the ambient noise at the eardrum.

In some exemplary embodiments, the acoustic device further includes a second sound sensor module physically connected to the support member, and configured to capture a second sound and generate a second sound signal; and the method further includes: by using the noise reduction circuit, obtaining the second sound signal from the second sound sensor module, generating a second noise cancellation signal based on the second sound signal, and sending the second noise cancellation signal to the speaker, so that the speaker converts the second noise cancellation signal into a second noise cancellation audio to further reduce the volume of the ambient noise at the eardrum.

In some exemplary embodiments, a phase of the ambient noise measured by the second sound sensor module is behind a phase of the ambient noise reaching a sound output end of the speaker.

In some exemplary embodiments, the noise reduction circuit includes a feedback filter; and the generating of the second noise cancellation signal based on the second sound signal includes: inputting the second sound signal into the feedback filter, and filtering the second sound signal by using the feedback filter, to obtain the second noise cancellation signal, where the feedback filter is configured to adjust at least one of a gain or phase of the second sound signal, so that the obtained second noise cancellation signal can cancel at least a part of the ambient noise at the eardrum.

As can be learned from the foregoing technical solutions, the present disclosure provides an open wearable acoustic device and an active noise reduction method. The acoustic device includes a first sound sensor module, a speaker, and a noise reduction circuit. A first sound signal captured by the first sound sensor module includes an ambient noise signal of ambient noise and a leakage signal from the speaker. The noise reduction circuit may first generate a quasi-ambient noise signal by reducing components of the leakage signal in the first sound signal, and then generate a first noise cancellation signal based on the quasi-ambient noise signal. Then the speaker converts the first noise cancellation signal into a first noise cancellation audio, so that the first noise cancellation audio cancels at least a part of ambient noise in a space at and near an eardrum, thereby achieving a noise reduction objective. In a feedforward noise reduction process, the noise reduction circuit reduces the components of the leakage signal in the first sound signal to reduce impact of the leakage signal on feedforward noise reduction. Therefore, a noise reduction effect of active noise reduction can be improved.

Other functions of the open wearable acoustic device and the active noise reduction method provided in the present disclosure are partially listed in the following descriptions. Creative aspects of the open wearable acoustic device and the active noise reduction method provided in the present disclosure may be fully explained by practicing or using the method, apparatus, and a combination thereof in the following detailed examples.

BRIEF DESCRIPTION OF THE DRAWINGS

To describe the technical solutions in some exemplary embodiments of the present disclosure more clearly, the following briefly describes the accompanying drawings required for describing the exemplary embodiments. Apparently, the accompanying drawings in the following description show merely some exemplary embodiments of the present disclosure, and a person of ordinary skill in the art may still derive other drawings from these accompanying drawings without creative efforts.

DESCRIPTION OF EMBODIMENTS

Figure 1A:
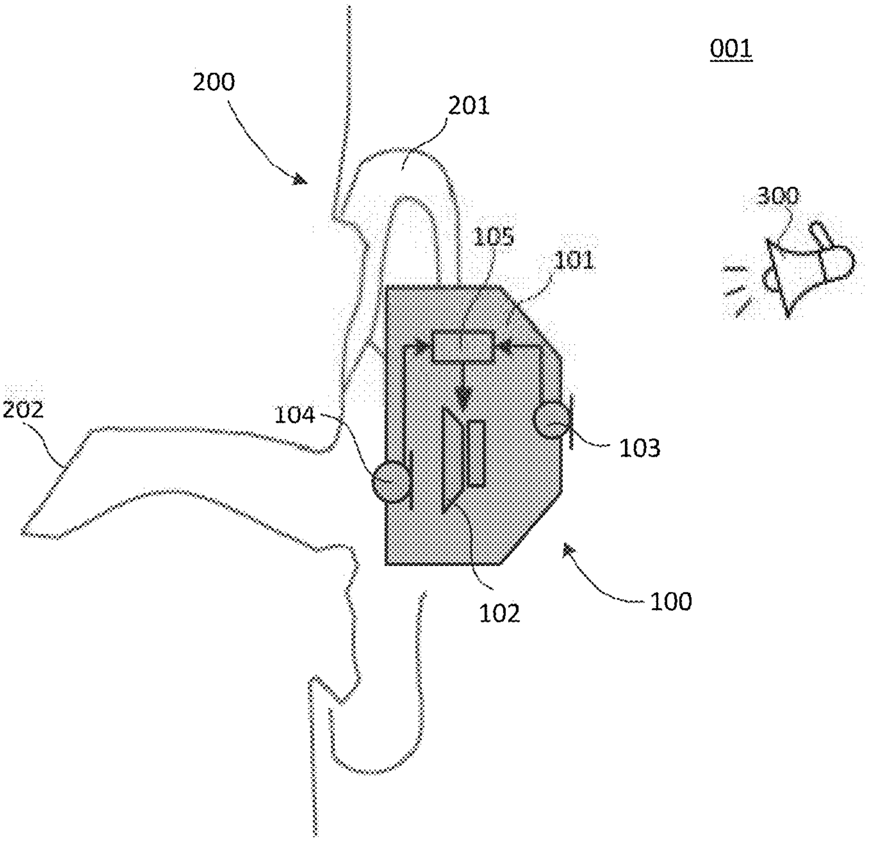
FIG. 1A is a schematic diagram of a scenario in which an acoustic device is worn according to some exemplary embodiments of the present disclosure.

The following description provides specific application scenarios and requirements of the present disclosure, to enable a person skilled in the art to make and use the contents of the present disclosure. Various partial modifications to the disclosed embodiments are obvious to a person skilled in the art. General principles defined herein can be applied to other embodiments and applications without departing from the spirit and scope of the present disclosure. Therefore, the present disclosure is not limited to the illustrated embodiments, but is to be accorded the widest scope consistent with the claims.

The terms used herein are only intended to describe specific exemplary embodiments and are not restrictive. For example, as used herein, singular forms “a”, “an”, and “the” may also include plural forms, unless otherwise clearly specified in a context. When used in the present disclosure, the terms “comprise”, “include”, and/or “contain” indicate presence of associated integers, steps, operations, elements, and/or components, but do not preclude presence of one or more other features, integers, steps, operations, elements, components, and/or groups or addition of other features, integers, steps, operations, elements, components, and/or groups to the system/method.

In view of the following description, these features and other features of the present disclosure, operations and functions of related elements of structures, and economic efficiency in combining and manufacturing components can be significantly improved. All of these constitute a part of the present disclosure with reference to the drawings. However, it should be clearly understood that the drawings are only for illustration and description purposes and are not intended to limit the scope of the present disclosure. It should also be understood that the drawings are not drawn to scale.

Flowcharts used in the present disclosure show operations implemented by the system according to some exemplary embodiments of the present disclosure. It should be clearly understood that operations in the flowcharts may be implemented out of order. Conversely, the operations may be implemented in a reverse order or simultaneously. In addition, one or more other operations may be added to the flowcharts, and one or more operations may be removed from the flowcharts.

For ease of description, the following first explains terms that appear in the present disclosure.

Closed acoustic device: For some acoustic devices, a closed space is formed between an acoustic device in a worn state and a user’s eardrum, and this type of acoustic device may be referred to as a closed acoustic device. For example, the acoustic device may use an in-ear design (for example, an earbud type headphone), a closed earmuff design, or another similar design, so that a closed space is formed between the acoustic device and the user’s eardrum. When the user wears the closed acoustic device, the closed space can physically isolate external noise and reduce interference of the external noise to the user. However, the user often feels discomfort when wearing the closed acoustic devices for a long time.

Open acoustic device: For some acoustic devices, an open space is formed between an acoustic device in a worn state and a user’s eardrum, and this type of acoustic device may be referred to as an open acoustic device. For example, the acoustic device may not fit into or cover an ear canal, or a sound transmission hole is provided on a surface of the acoustic device, so that an open space is formed between the acoustic device and the eardrum. The open acoustic device can improve the user’s wearing comfort and make a sound heard by the user more penetrating and natural.

Noise: In the present disclosure, any sound that is unwelcome to the user or unwanted by the user, or interferes with the user's hearing may be referred to as noise.

Passive noise reduction: It may reference may be made to a technology for reducing noise in a passive mode. The passive mode includes, but is not limited to, eliminating (or partially eliminating) a noise source, preventing propagation of noise, preventing the user's ear from hearing noise, or the like, or any combination thereof. For example, a technology for implementing noise reduction by forming a closed space in the ear is a type of passive noise reduction technology. The passive noise reduction technology may also be referred to as a passive noise reduction method. Passive noise reduction does not cancel noise, but physically suppresses the noise.

Active noise reduction: It may reference may be made to a technology for reducing noise actively by generating a noise cancellation signal (for example, a signal whose phase is opposite to that of the noise to be suppressed). Specifically, in an acoustic device using the active noise reduction technology, a noise signal can be captured by a sound sensor, a noise cancellation signal for canceling the noise signal is generated by using a noise reduction circuit, and the noise cancellation signal is played by using a speaker, so that the noise cancellation signal cancels the noise signal, thereby canceling noise. The active noise reduction technology may also be referred to as an active noise reduction method. The active noise reduction technology may be divided into feedforward noise reduction, feedback noise reduction, and hybrid noise reduction.

Feedforward noise reduction: A sound sensor is placed on an outer side of an acoustic device, the sound sensor captures ambient noise and generates an ambient noise signal, a feedforward filter filters the ambient noise signal and generates a noise cancellation signal, and a speaker plays the noise cancellation signal. In this way, the noise cancellation signal cancels (or partially cancels) ambient noise at the eardrum, so that volume of the ambient noise heard by the user is reduced. The feedforward filter is mainly used to compensate for a difference between the ambient noise at the eardrum and the ambient noise captured by the sound sensor. In a feedforward noise reduction system, an open-loop noise reduction control system is formed between the speaker and the sound sensor.

Feedback noise reduction: A sound sensor is placed on an inner side of an acoustic device, the sound sensor captures ambient noise in an area near the eardrum, a feedback filter filters the ambient noise and generates a noise cancellation signal, and a speaker plays the noise cancellation signal. In this way, the noise cancellation signal cancels (or partially cancels) ambient noise at the eardrum, so that volume of the ambient noise heard by the user is reduced. In a feedback noise reduction system, a closed-loop noise reduction control system is formed between the speaker and the sound sensor.

Hybrid noise reduction: Hybrid noise reduction refers to a technology integrating feedforward noise reduction and feedback noise reduction. Generally, compared with feedforward noise reduction or feedback noise reduction alone, hybrid noise reduction can further improve a noise reduction effect.

The present disclosure provides an open wearable acoustic device (hereinafter referred to as the "acoustic device") and an active noise reduction method for the acoustic device, in order to reduce volume of ambient noise heard by a user and to reduce interference of the ambient noise to the user in a scenario in which the user wears the acoustic device.

FIG. 1A is a schematic diagram of a scenario in which an acoustic device is worn according to some exemplary embodiments of the present disclosure. In a scenario 001, the acoustic device 100 is worn on an ear 200 of a user. The ear 200 may include a pinna 201 and an eardrum 202. The acoustic device 100 may be worn at the pinna 201. The acoustic device 100 and the eardrum 202 are not closed, thereby forming an open space. The scenario 001 may further include a noise source 300. There may be one or more noise sources 300. The noise source 300 is configured to emit ambient noise (for example, any sound that is unwelcome to the user or unwanted by the user, or interferes with the user's hearing). The acoustic device 100 is configured to suppress or cancel the ambient noise heard by the human ear. Specifically, the acoustic device 100 uses the active noise reduction mode to suppress or cancel the ambient noise by generating and outputting a noise cancellation signal (a signal whose phase is opposite to that of the ambient noise).

In some exemplary embodiments, the acoustic device 100 may be a headphone, a muffler, a hearing aid, acoustic glasses, or the like, or any combination thereof. For ease of understanding, a headphone is used as an example of the acoustic device 100 in FIG. 1A. When the acoustic device 100 is acoustic glasses, a sound output apparatus may be disposed in an area of a temple of the acoustic glasses close to the ear, and configured to output a sound to the user's ear. It should be noted that the acoustic device 100 may be worn on the user's ear 200 in any manner. This is not limited in the present disclosure. For example, the acoustic device 100 may be worn on the head, worn in the ear, worn around the neck, hung on the ear, clipped on the ear, or the like, or worn in any combination of the foregoing manners.

In some exemplary embodiments, the scenario 001 may further include a network and a target device (not shown in FIG. 1A). The target device may be an electronic device having an audio output function. The acoustic device 100 may be communicatively connected to (in communication with) the target device via the network, or data or signals may be transmitted between the acoustic device 100 and the target device via the network. For example, the target device may send a to-be-played target audio (such as music or a speech) to the acoustic device 100 via the network, so that the acoustic device 100 outputs the target audio to the user.

In some exemplary embodiments, an audio capture apparatus may be provided with the target device, and the target audio is captured by using the audio capture apparatus. In some exemplary embodiments, the target device may receive the target audio from another device. In some exemplary embodiments, the target device may include a mobile device, a tablet computer, a laptop computer, a built-in device in a motor vehicle, or the like, or any combination thereof. In some exemplary embodiments, the mobile device may include a smart household device, a smart mobile device, a virtual reality device, an augmented reality device, or the like, or any combination thereof. In some exemplary embodiments, the smart household apparatus may include a smart television, a desktop computer, a smart speaker, or the like, or any combination thereof. In some exemplary embodiments, the smart mobile device may include a smartphone, a personal digital assistant, a gaming device, a navigation device, or the like, or any combination thereof. In some exemplary embodiments, the virtual reality (VR) device or the augmented reality (AR) device may include a virtual reality helmet, virtual reality glasses, a virtual reality patch, an augmented reality helmet, augmented reality glasses, an augmented reality patch, or the like, or any combination thereof. For example, the virtual reality device or the augmented reality device may include Google Glass, a head-mounted display, a VR, or the like. In some exemplary embodiments, the built-in apparatus of the motor vehicle may include a vehicle-mounted computer, a vehicle-mounted television, or the like.

In some exemplary embodiments, the network may be any type of wireless network. For example, the network may include a telecommunications network, an intranet, the Internet, a local area network (LAN), a wide area network (WAN), a wireless local area network (WLAN), a metropolitan area network (MAN), a public switched telephone network (PSTN), a Bluetooth network, a ZigBee network, a near field communication (NFC) network, or a similar network. In some exemplary embodiments, the network may be a Bluetooth network. In this case, the acoustic device 100 may communicate with the target device through the Bluetooth protocol.

With continued reference to FIG. 1A, the acoustic device 100 may include a support member 101, a speaker 102, a noise reduction circuit 105, and at least one sound sensor module. Both the speaker 102 and the at least one sound sensor module may be physically connected to the support member 101.

The support member 101 may be used to help secure the acoustic device 100 to the user's ear. For example, the support member 101 may be a housing or another additional structure of the acoustic device 100. It should be noted that a specific form of the support member 101 is not limited in the present disclosure. It should be understood that the specific form of the support member 101 is related to a wearing manner supported by the acoustic device 100.

Figure 1B:
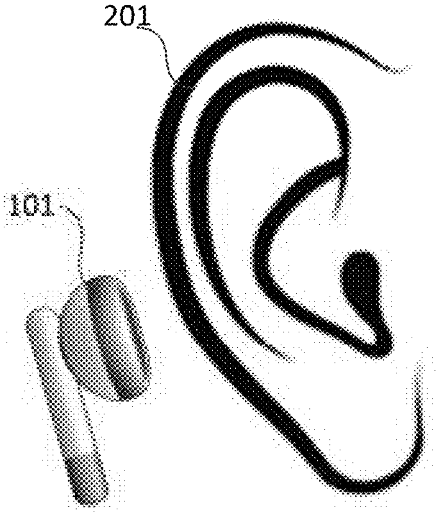
FIG. 1B is a schematic diagram of an acoustic device worn in an in-ear manner.
Figure 1C:
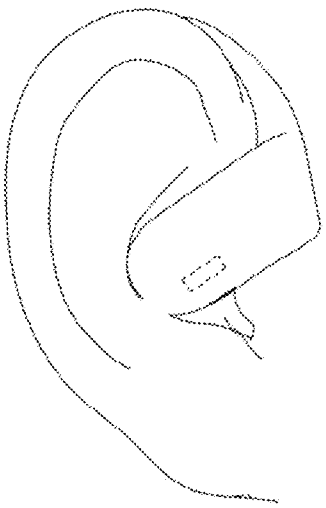
FIG. 1C is a schematic diagram of an acoustic device worn in an ear-hung manner.
Figure 1D:
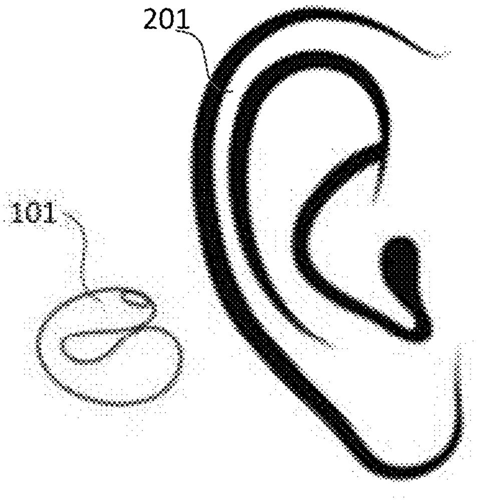
FIG. 1D is a schematic diagram of an acoustic device worn in an ear-clipped manner.

FIG. 1B is a schematic diagram of the acoustic device worn in an in-ear manner. In this case, the support member 101 may be designed to fit the pinna 201. There may be one or more support points on the support member 10 to fit preset points on the pinna 201. FIG. 1C is a schematic diagram of the acoustic device worn in an ear-hung manner. In this case, the support member 101 may use a suspension structure, so that the acoustic device 100 can be hung on the pinna 201. FIG. 1D is a schematic diagram of the acoustic device worn in an ear-clipped manner. In this case, the support member 101 may use a clip structure, so that the support member 101 can be clipped on the pinna 201.

With continued reference to FIG. 1A, the speaker 102 may be disposed on one side of the acoustic device 100 near an ear canal opening. When the acoustic device 100 is worn on the user's head, an open space is formed between the speaker 102 and the user's eardrum 202. In some exemplary embodiments, when the acoustic device 100 is worn on the user's head, the speaker 102 may be placed close to the user's ear canal opening without blocking the ear canal opening, thereby forming an open space between the speaker 102 and the eardrum 202. In some exemplary embodiments, the housing of the acoustic device 100 may be a non-closed housing. For example, a sound transmission hole is provided on the housing, so that an open space is formed between the speaker 102 and the eardrum 202.

The speaker 102 may be configured to generate an audio based on an audio signal (or convert an audio signal into an audio). The audio signal herein is an electrical signal that carries sound information. The audio is a sound signal played by the speaker. After a sound is emitted from an original sound source (such as an ambient noise source or a human throat), a sensor (such as a microphone) capturing the sound converts the sound into an electrical signal that carries the sound information, that is, the audio signal. The speaker 102 may also be referred to as an electroacoustic transducer. When working, the speaker 102 may receive the audio signal carrying the sound information, and then convert the audio signal into the sound signal for playing. In some exemplary embodiments, the acoustic device 100 may include a plurality of speakers 102. In this case, the plurality of speakers 102 may be arranged in an array, such as a linear array, a planar array, a spherical array, or another array.

In some exemplary embodiments, the at least one sound sensor module may include a first sound sensor module 103. As shown in FIG. 1A, the first sound sensor module 103 is farther away from the eardrum 202 than the speaker 102. In other words, the first sound sensor 103 may be disposed on an outer side of the acoustic device 100 (when the acoustic device 100 is worn on the user's head, one side of the acoustic device 100 away from the eardrum 202 is used as the outer side). In some exemplary embodiments, the first sound sensor module 103 may include one or more sound sensors. When the first sound sensor module 103 includes a plurality of sound sensors, the plurality of sound sensors may be arranged in an array, such as a linear array, a planar array, a spherical array, or another array. In some exemplary embodiments, the sound sensor is an apparatus for capturing a sound and converting the sound into an electrical signal, such as a microphone.

In some exemplary embodiments, the at least one sound sensor module may include a second sound sensor module 104. The second sound sensor module 104 is closer to (nearer) the eardrum 202 than the speaker 102. In other words, the second sound sensor module 104 is disposed on an inner side of the acoustic device 100 (when the acoustic device 100 is worn on the user's head, one side of the acoustic device 100 closer to the eardrum 202 is used as the inner side). In some exemplary embodiments, the second sound sensor module 104 may include one or more sound sensors. When the second sound sensor module 104 includes a plurality of sound sensors, the plurality of sound sensors may be arranged in an array, such as a linear array, a planar array, a spherical array, or another array.

In some exemplary embodiments, the at least one sound sensor module may include both the first sound sensor module 103 and the second sound sensor module 104.

The first sound sensor module 103 is configured to capture a first sound and generate a first sound signal corresponding to the first sound. The first sound may be a sound analog signal, and the first sound signal may be an electrical signal. It should be understood that, due to presence of the noise source 300 in an environment in which the acoustic device 100 is located, the first sound sensor module 103 may capture ambient noise emitted by the noise source 300. In addition, due to the open space formed between the speaker 102 and the eardrum 202, the first sound sensor module 103 may also capture a sound emitted by the speaker 102. For ease of description, the sound captured from the speaker 102 by the first sound sensor module 103 is referred to as a leakage sound in the present disclosure. Therefore, the first sound captured by the first sound sensor module 103 includes the ambient noise and the leakage sound. Correspondingly, the first sound signal generated by the first sound sensor module 103 includes an ambient noise signal from the noise source 300 and the leakage signal from the speaker 102.

The first sound sensor module 103 is farther away from the eardrum 202 than the speaker 102, that is, the first sound sensor module 103 is closer to the noise source 300 than the speaker 102. Therefore, a moment when the ambient noise reaches the first sound sensor module 103 is earlier than a moment when the ambient noise reaches a sound output end of the speaker 102. In other words, a phase of the ambient noise reaching the first sound sensor module 103 is ahead of a phase of the ambient noise reaching the sound output end of the speaker 102. Therefore, the first sound signal captured by the first sound sensor module 103 can be used for feedforward noise reduction.

The second sound sensor module 104 is configured to capture a second sound and generate a second sound signal corresponding to the second sound. The second sound may be a sound analog signal, and the second sound signal may be an electrical signal. For an open acoustic device, on one hand, the second sound sensor module 104 can capture the ambient noise emitted by the noise source 300, and on the other hand, the second sound sensor module 104 can capture the sound emitted by the speaker 102. Therefore, the second sound captured by the second sound sensor module 104 includes components of the ambient noise and components of the sound emitted by the speaker 102. In an active noise reduction scenario, the ambient noise emitted by the noise source 300 is transmitted through the air to the open space, and a part of the ambient noise in the open space is canceled or weakened by the sound of the speaker 102 in an active noise reduction process. Therefore, the second sound captured by the second sound sensor module 104 may also be referred to as residual noise, that is, residual ambient noise in the open space.

The second sound sensor module 104 is closer to (nearer) the eardrum 202 than the speaker 102, that is, the second sound sensor module 104 is farther away from the noise source 300 than the speaker 102. Therefore, a moment when the ambient noise reaches the second sound sensor module 104 is later than a moment when the ambient noise reaches the sound output end of the speaker 102. In other words, a phase of the ambient noise reaching the second sound sensor module 104 is behind of the phase of the ambient noise reaching the sound output end of the speaker 102. Therefore, the second sound signal captured by the second sound sensor module 104 can be used for feedback noise reduction.

With continued reference to FIG. 1A, the noise reduction circuit 105 is connected to the first sound sensor module 103, the second sound sensor module 104, and the speaker 102, and configured to perform active noise reduction to reduce volume of the ambient noise heard by the human ear. The active noise reduction may be any one of feedforward noise reduction, feedback noise reduction, and hybrid noise reduction.

In some exemplary embodiments, the noise reduction circuit 105 may be configured to perform feedforward noise reduction. In this case, the noise reduction circuit 105 may obtain the first sound signal from the first sound sensor module 103 and perform active noise reduction based on the first sound signal.

In some exemplary embodiments, that the noise reduction circuit 105 performs active noise reduction based on the first sound signal may include: the noise reduction circuit 105 generates a first noise cancellation signal based on the first sound signal. The noise reduction circuit 105 sends the first noise cancellation signal to the speaker 102, so that the speaker 102 converts the first noise cancellation signal into a first noise cancellation audio. A phase of the first noise cancellation signal may be set to be opposite or approximately opposite to the phase of the ambient noise in the space at the eardrum 202 or at a preset phase difference, so that a phase of the first noise cancellation audio is opposite or approximately opposite to the phase of the ambient noise in the space at and near the eardrum 202, thereby reducing the volume of the ambient noise at the eardrum 202. In some exemplary embodiments, the noise reduction circuit 105 may include a feedforward filter in communication with the first sound sensor module 103 and the speaker 102. After obtaining the first sound signal from the first sound sensor 103, the noise reduction circuit 105 may input the first sound signal into the feedforward filter, filter the first sound signal by using the feedforward filter, so as to obtain the first noise cancellation signal, and output the first noise cancellation signal to the speaker 102. The feedforward filter is configured to adjust at least one of a gain or phase of the first sound signal, so that the obtained first noise cancellation signal can cancel at least a part of the ambient noise at the eardrum 202.

In some exemplary embodiments, the noise reduction circuit 105 may also be configured to perform feedback noise reduction. In this case, the noise reduction circuit 105 may obtain the second sound signal from the second sound sensor module 104 and perform active noise reduction based on the second sound signal.

In some exemplary embodiments, the process of performing active noise reduction based on the second sound signal by the noise reduction circuit 105 may include: the noise reduction circuit 105 generates a second noise cancellation signal based on the second sound signal. The noise reduction circuit 105 sends the second noise cancellation signal to the speaker 102, so that the speaker 102 converts the second noise cancellation signal into a second noise cancellation audio. A phase of the second noise cancellation signal may be set to be opposite or approximately opposite to the phase of the ambient noise at the eardrum 202 or at a preset phase difference, so that a phase of the second noise cancellation audio is opposite or approximately opposite to the phase of the ambient noise in the space at and near the eardrum 202, thereby reducing the volume of the ambient noise at the eardrum 202. In some exemplary embodiments, the noise reduction circuit 105 may include a feedback filter connected to the second sound sensor module 103 and the speaker 102. After obtaining the second sound signal from the second sound sensor 103, the noise reduction circuit 105 may input the second sound signal into the feedback filter, filter the second sound signal by using the feedback filter, to obtain the second noise cancellation signal, and output the second noise cancellation signal to the speaker 102. The feedback filter is configured to adjust at least one of a gain or phase of the second sound signal, so that the obtained second noise cancellation signal can cancel at least a part of the ambient noise at the eardrum 202.

In some exemplary embodiments, the noise reduction circuit 105 may also be configured to perform hybrid noise reduction. In this case, the noise reduction circuit 105 may obtain the first sound signal from the first sound sensor module 103, obtain the second sound signal from the second sound sensor module 104, and perform active noise reduction based on the first sound signal and the second sound signal.

In some exemplary embodiments, the process of performing active noise reduction based on the first sound signal and the second sound signal by the noise reduction circuit 105 may include: the noise reduction circuit 105 generates the first noise cancellation signal based on the first sound signal and generates the second noise cancellation signal based on the second sound signal. The noise reduction circuit 105 sends the first noise cancellation signal and the second noise cancellation signal to the speaker 102, so that the speaker 102 converts the first noise cancellation signal and the second noise cancellation signal into noise cancellation audios to reduce the volume of the ambient noise in the space at and near the eardrum 202. In some exemplary embodiments, the noise reduction circuit 105 may include a feedforward filter and a feedback filter. The feedforward filter is in communication with the first sound sensor module 103 and the speaker 102. The feedback filter is connected to the second sound sensor module 104 and speaker 102. The noise reduction circuit 105 may input the first sound signal into the feedforward filter, filter the first sound signal by using the feedforward filter to obtain the first noise cancellation signal, input the second sound signal into the feedback filter, and filter the second sound signal by using the feedback filter to obtain the second noise cancellation signal. Then the noise reduction circuit 105 sends the first noise cancellation signal and the second noise cancellation signal to the speaker 102. The feedforward filter is configured to adjust at least one of a gain or phase of the first sound signal, so that an audio generated after the obtained first noise cancellation signal is converted by the speaker 102 can cancel at least a part of the ambient noise in the space at and near the eardrum 202 (that is, a phase of the audio is opposite or approximately opposite to a phase of the at least a part of the ambient noise in the space at and near the eardrum 202). The feedback filter is configured to adjust at least one of a gain or phase of the second sound signal, so that an audio generated after the obtained second noise cancellation signal is converted by the speaker 102 can cancel at least a part of the ambient noise at the eardrum 202 (that is, a phase of the audio is opposite or approximately opposite to a phase of the at least a part of the ambient noise in the space at and near the eardrum 202). In some exemplary embodiments, the noise reduction circuit 105 may send the first noise cancellation signal and the second noise cancellation signal to the speaker 102 separately. In some exemplary embodiments, the noise reduction circuit 105 may first combine the first noise cancellation signal and the second noise cancellation signal to obtain a combined noise cancellation signal, and then send the combined noise cancellation signal to the speaker 102.

In some exemplary embodiments, the noise reduction circuit 105 may be configured to perform an active noise reduction method described in the present disclosure. In this case, the noise reduction circuit 105 may store data or instructions for performing the active noise reduction method described in the present disclosure, and may execute the data and/or the instructions. In some exemplary embodiments, the noise reduction circuit 105 may include a hardware device having a data information processing function and a program required to drive the hardware device to work. The active noise reduction method is described in detail in the subsequent content.

Figure 2:
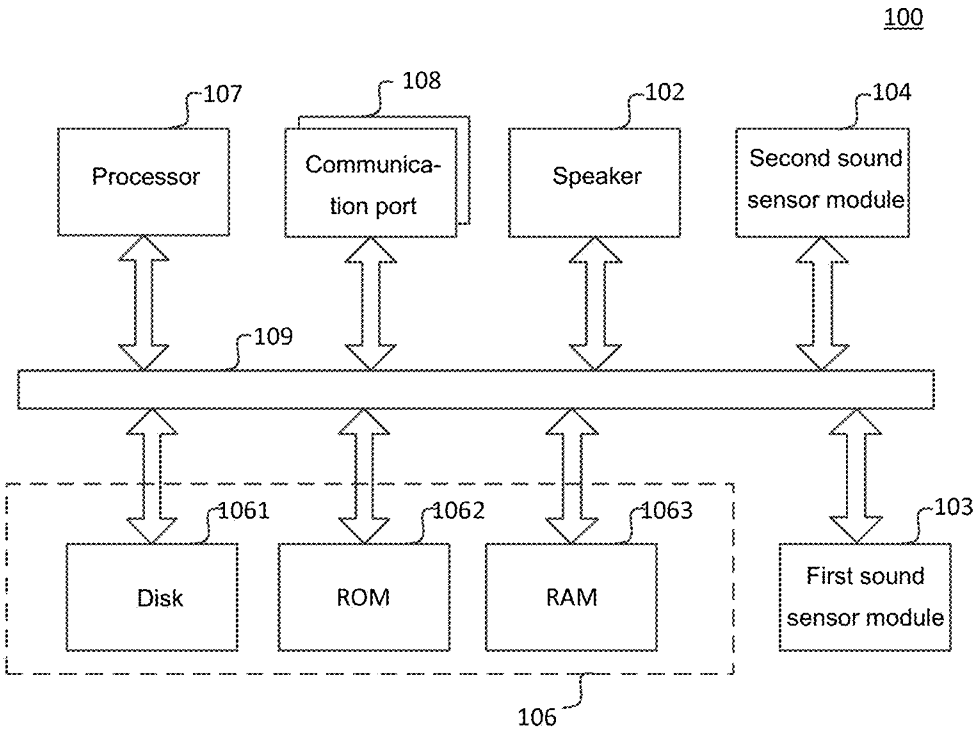
FIG. 2 is a schematic diagram of a hardware structure of an acoustic device according to some exemplary embodiments of the present disclosure.

FIG. 2 is a schematic diagram of a hardware structure of an acoustic device according to some exemplary embodiments of the present disclosure. As shown in FIG. 2, in some exemplary embodiments, a noise reduction circuit 105 may include at least one storage medium 106 and at least one processor 107. The least one processor 107 is communicatively connected to a speaker 102, a first sound sensor module 103, and a second sound sensor module 104. It should be noted that for demonstration purposes only, the noise reduction circuit 105 in the present disclosure includes at least one storage medium 106 and at least one processor 107. A person of ordinary skill in the art (one of ordinary skill in the art) may understand that the noise reduction circuit 105 may also include other hardware circuit structures. This is not limited in the present disclosure as long as functions mentioned in the present disclosure are satisfied without departing from the spirit of the present disclosure.

In some exemplary embodiments, the acoustic device 100 may further include a communications port 108. The communications port 108 is used for data communication between the acoustic device 100 and the outside world. For example, the communications port 108 may be used for data communication between the acoustic device 100 and other devices.

In some exemplary embodiments, the acoustic device 100 may further include an internal communications bus 109. The internal communications bus 109 may connect different system components. For example, the speaker 102, the first sound sensor module 103, the second sound sensor module 104, the processor 107, the storage medium 106, and the communications port 108 may all be connected by using the internal communications bus 109.

The storage medium 106 may include a data storage apparatus. The data storage apparatus may be a non-transitory storage medium, or may be a transitory storage medium. For example, the data storage apparatus may include one or more of a magnetic disk 1061, a read-only memory (ROM) 1062, or a random access memory (RAM) 1063. The storage medium 106 further includes at least one instruction set stored in the data storage apparatus. The instruction set includes instructions, the instructions are computer program code, and the computer program code may include a program, a routine, an object, a component, a data structure, a process, a module, or the like for performing the active noise reduction method provided in the present disclosure.

The at least one processor 107 is configured to execute the at least one instruction set. When the acoustic device 100 runs, the at least one processor 107 reads the at least one instruction set, and performs, as instructed by the at least one instruction set, the active noise reduction method provided by the present disclosure. The processor 107 may perform all or a part of steps included in the active noise reduction method. The processor 107 may be in a form of one or more processors. In some exemplary embodiments, the processor 107 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor that can implement one or more functions, and the like, or any combination thereof. For illustrative purposes only, the acoustic device 100 shown in FIG. 2 illustrates a case in which only one processor 107 is included. However, it should be noted that the acoustic device 100 in the present disclosure may further include a plurality of processors. Therefore, operations and/or method steps disclosed in the present disclosure may be performed by one processor in the present disclosure, or may be performed jointly by a plurality of processors. For example, if the processor 107 of the acoustic device 100 in the present disclosure performs step A and step B, it should be understood that step A and step B may also be performed jointly or separately by two different processors 120 (for example, the first processor performs step A, and the second processor performs step B, or the first processor and the second processor jointly perform step A and step B).

A person of ordinary skill in the art may appreciate that FIG. 2 is only one design of the noise reduction circuit 105. The noise reduction circuit 105 may also be designed in other hardware forms without departing from the principles of the present disclosure. A specific design scheme of the noise reduction circuit 105 is not limited in the present disclosure.

As shown above, in the open acoustic device, the first sound signal captured and generated by the first sound sensor module 103 is not a pure ambient noise signal, but a mixed sound signal including an ambient noise signal and a leakage signal. Therefore, if the noise reduction circuit 105 performs feedforward noise reduction directly based on the first sound signal, the leakage signal has impact on a feedforward noise reduction process, resulting in a poor feedforward noise reduction effect.

In some exemplary embodiments, to reduce the impact of the leakage signal on the feedforward noise reduction effect, the acoustic device 100 may be physically isolated by disposing the first sound sensor module 103 at an acoustic null point of the speaker 102. For example, the speaker 102 may have a dipole horn design, and the first sound sensor module 103 is located at an acoustic null point of a dipole horn. Therefore, the first sound sensor module 103 is unable to capture any leakage signal from the speaker 102, or captures only few leakage signals.

Figure 3:
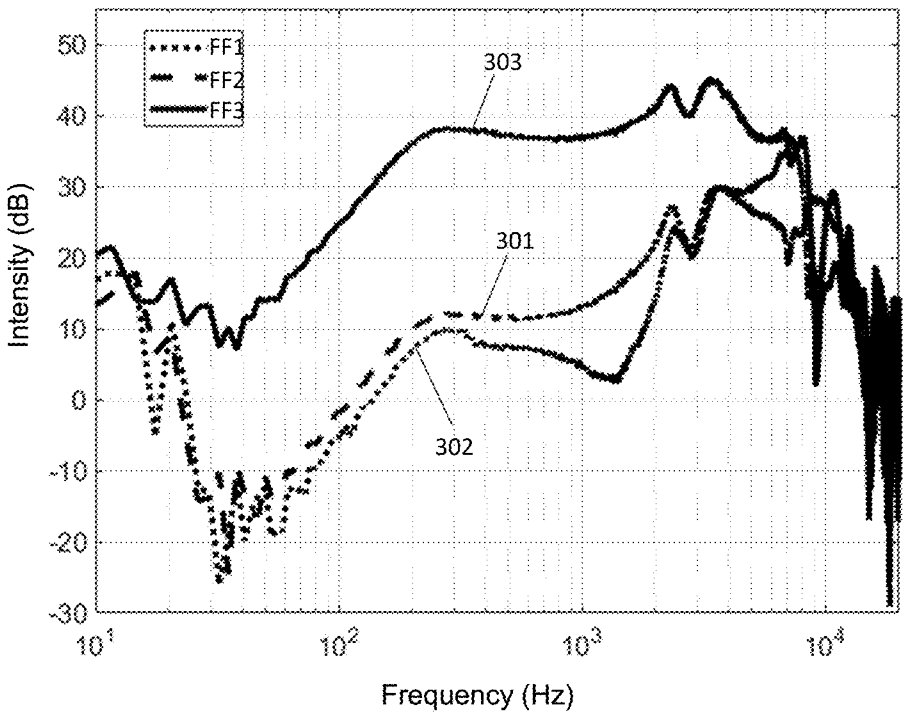
FIG. 3 is a schematic diagram of leakage signals captured by sound sensors at different positions in an acoustic device.

FIG. 3 is a schematic diagram of leakage signals captured by sound sensors at different positions in the acoustic device. FF1 and FF2 represent sound sensors located at acoustic null points of the speaker 102, and FF3 represents a sound sensor located near the speaker 102. In a test process, after the speaker 102 is given an excitation signal, a leakage signal captured by FF1 is obtained, and a curve 301 shown in FIG. 3 is obtained; a leakage signal captured by FF2 is obtained, and a curve 302 shown in FIG. 3 is obtained; and a leakage signal captured by FF3 is obtained, and a curve 303 shown in FIG. 3 is obtained. As can be seen from FIG. 3, when an ambient frequency is low (for example, lower than 1500 Hz), the leakage signals captured by FF1 and FF2 are weakened by more than 20 dB in comparison with the leakage signal captured by FF3, and a noise reduction effect can be achieved.

In some exemplary embodiments, a distance between the first sound sensor module 103 and an acoustic null point of the speaker 102 is within a preset non-zero range. In other words, the first sound sensor module 103 may be disposed at a position closer to the acoustic null point of the speaker 102, rather than strictly at the acoustic null point of the speaker 102. In this way, requirements for a structural design and an assembly process of the acoustic device 100 can be reduced.

The present disclosure provides an active noise reduction method P100. By reducing components of a leakage signal in a first sound signal, the method can reduce impact of the leakage signal on feedforward noise reduction, thereby improving a noise reduction effect. The active noise reduction method P100 may be applied to a scenario in which a first sound sensor module 103 is not disposed at an acoustic null point of a speaker 102, or may be applied to a scenario in which a first sound sensor module 103 is disposed at an acoustic null point of a speaker 102. In the scenario in which the first sound sensor module 103 is disposed at the acoustic null point of the speaker 102, because there is still a problem in some bands that signals of the speaker leak to the first sound sensor module (for example, when the frequency in FIG. 3 is higher than 5000 Hz, the leakage signals captured by FF1 and FF2 are basically equivalent to the leakage signal captured by FF3), the active noise reduction method P100 provided in the present disclosure may be used to perform active noise reduction for a leaking band to improve a noise reduction effect. The active noise reduction method P100 may be applied independently to the acoustic device 100 provided in the present disclosure, or may be combined with other active noise reduction methods described in other parts of the present disclosure.

Figure 4:
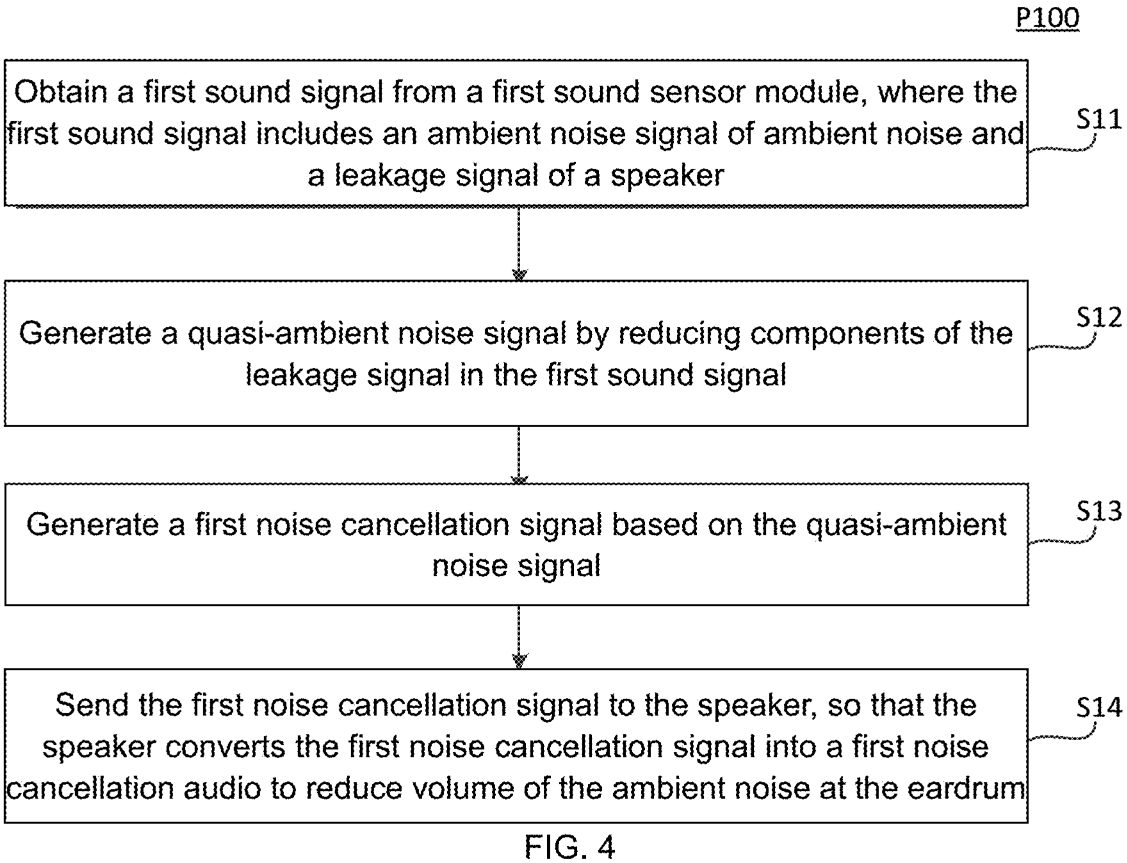
FIG. 4 is a flowchart of an active noise reduction method according to some exemplary embodiments of the present disclosure.

FIG. 4 is a flowchart of an active noise reduction method according to some exemplary embodiments of the present disclosure. The active noise reduction method P100 may be performed by the noise reduction circuit 105 in the acoustic device 100. For example, when the noise reduction circuit 105 uses the structure shown in FIG. 2, the processor 107 in the noise reduction circuit 105 may read an instruction set stored in the local storage medium of the noise reduction circuit 105 and then perform, as instructed by the instruction set, the active noise reduction method P100 described in the present disclosure. As shown in FIG. 4, the active noise reduction method P100 may include the following steps.

S11. Obtain a first sound signal from the first sound sensor module, where the first sound signal includes an ambient noise signal of ambient noise and a leakage signal of a speaker.

As described above, the first sound sensor module 103 captures the first sound and converts the first sound into the first sound signal. The first sound is actually a mixed sound including the ambient noise from the noise source 300 and a leakage sound from the speaker 102. Therefore, the first sound signal includes both the ambient noise signal corresponding to the ambient noise and the leakage signal corresponding to the leakage sound. The noise reduction circuit 105 is connected to the first sound sensor module 103, and may obtain the first sound signal from the first sound sensor module 103.

S12. Generate a quasi-ambient noise signal by reducing components of the leakage signal in the first sound signal.

Specifically, the noise reduction circuit 105 may measure, in some manners, the components of the leakage signal included in the first sound signal, and then subtract the components of the leakage signal from the first sound signal to obtain the quasi-ambient noise signal. It should be noted that the components of the leakage signal measured above may be different from those of the actual leakage signal. Therefore, a result obtained by subtracting the components of the leakage signal measured above from the first sound signal is not strictly equal to the actual ambient noise signal, but approximately equal to the actual ambient noise signal. Therefore, the subtraction result in the present disclosure is referred to as the quasi-ambient noise signal. The quasi-ambient noise signal may be understood as a compensation signal obtained by compensating for the leakage of the first sound signal.

Figure 5:
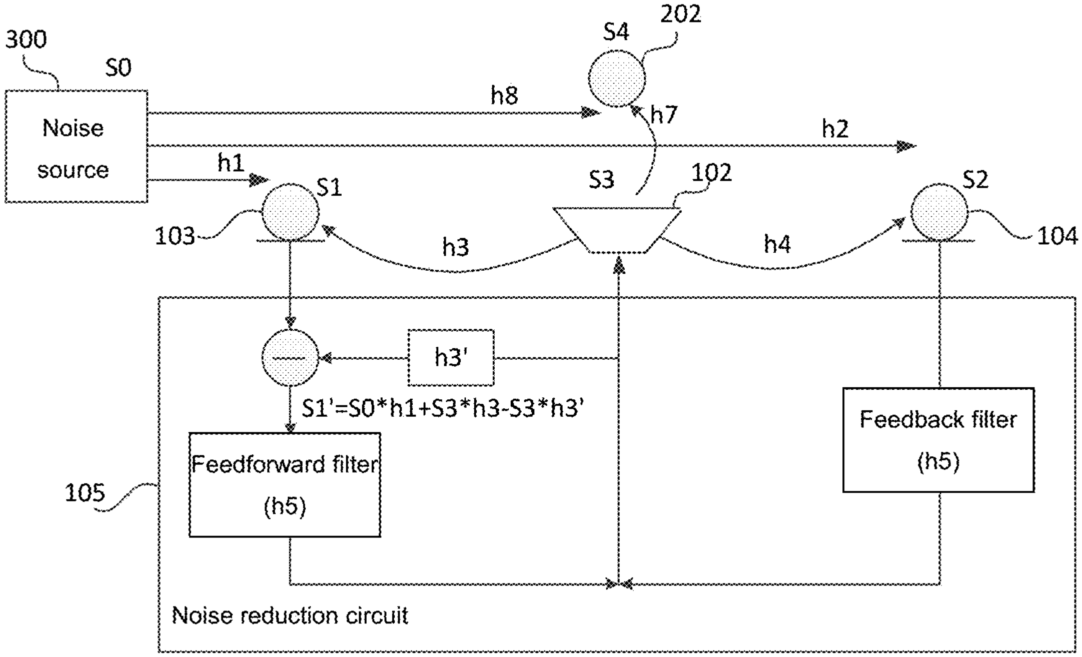
FIG. 5 is a schematic diagram of an active noise reduction mechanism of an acoustic device according to some exemplary embodiments of the present disclosure.

FIG. 5 is a schematic diagram of an active noise reduction principle of the acoustic device according to some exemplary embodiments of the present disclosure. As shown in FIG. 5, the following is assumed:

A transfer function from a sound emitted by the noise source 300 to an audio signal measured by the first sound sensor module 103 is denoted as h1;

a transfer function from a sound emitted by the noise source 300 to an audio signal measured by the second sound sensor module 104 is denoted as h2;

a transfer function from a sound emitted by the speaker 102 to an audio signal measured by the first sound sensor module 103 is denoted as h3;

a transfer function from a sound emitted by the speaker 102 to an audio signal measured by the second sound sensor module 104 is denoted as h4;

a transfer function between an input and an output of the feedforward filter is denoted as h5;

a transfer function between an input and an output of the feedback filter is denoted as h6;

an acoustic transfer function for propagation of a sound emitted by the speaker 102 to the eardrum 202 is denoted as h7; and an acoustic transfer function for propagation of a sound emitted by the noise source 300 to the eardrum 202 is denoted as h8.

Ambient noise emitted by the noise source 300 is denoted as S0; a first sound signal captured by the first sound sensor module 103 is denoted as S1; a second sound signal captured by the second sound sensor module 104 is denoted as S2; a noise cancellation signal emitted by the speaker 102 is denoted as S3; and ambient noise at the eardrum 202 is denoted as S4. It should be noted that in the present disclosure, S4 refers to ambient noise actually heard by a human ear, that is, residual ambient noise at the eardrum 202 after noise reduction processing.

According to an acoustic transfer process shown in FIG. 5, the following relationships exist between S0, S1, S2, S3, and S4:

$$S4 = S3 * h7 + S0 * h8 \quad \text{formula (0)}$$

$$S3 = S1 * h5 \quad \text{formula (1-1)}$$

$$S3 = S2 * h6 \quad \text{formula (1-2)}$$

$$S3 = S1 * h5 + S2 * h6 \quad \text{formula (1-3)}$$

$$S1 = S0 * h1 + S3 * h3 \quad \text{formula (2)}$$

$$S2 = S3 * h4 + S0 * h2 \quad \text{formula (3)}$$

The formula (1-1) corresponds to a feedforward noise reduction mode, the formula (1-2) corresponds to a feedback noise reduction mode, and the formula (1-3) corresponds to a hybrid noise reduction mode.

The following uses the feedforward noise reduction mode as an example to analyze a design principle of the feedforward filter h5.

In the feedforward noise reduction mode, substituting the formula (2) into the formula (1-1) may yield:

$$S3 = \frac{S0 * h1 * h5}{1 - h3 * h5} \quad \text{formula (4)}$$

Substituting the formula (4) into the formula (0) yields:

$$S4 = S0 * h8 + \frac{S0 * h1 * h5}{1 - h3 * h5} * h7 \quad \text{formula (5)}$$

In an ideal case (a case in which the sound emitted by the speaker 102 does not leak to the first sound sensor module 103), h3=0, and substituting it into the formula (5) yields:

$$S4 = S0 * (h8 + h1 * h5 * h7) \quad \text{formula (6)}$$

Usually, a noise reduction objective of the active noise reduction technology is to minimize S4. Based on the formula (6), it can be learned that h5 needs to compensate for h1, h7, and h8 in the ideal case. In this case, the first sound sensor module may be referred to as an ideal feedforward sound sensor module, and the feedforward filter may be referred to as an ideal feedforward filter.

However, in a non-ideal case, in particular, when the first sound sensor module 103 in the open acoustic device is not located at an acoustic null point of the speaker 102, h3≠0. Therefore, the noise reduction circuit 105 can measure the transfer function h3 from the speaker 102 to the first sound sensor module 103 by means of internal model control, where h3'≈h3. In the present disclosure, considering that there is an error between the measured transfer function h3' and a real transfer function h3, the transfer function h3' may also be referred to as a measured transfer function. In the feedforward noise reduction process, the noise reduction circuit 105 may use h3' to compensate for the first sound signal and obtain the quasi-ambient noise signal. Then the noise reduction circuit 105 may filter the quasi-ambient noise signal by using the ideal feedforward filter, to obtain a first noise cancellation signal.

In some exemplary embodiments, h3' may be measured in the following manner: The noise reduction circuit 105 sends a test audio signal to the speaker 102, so that the speaker 102 emits a corresponding test audio and that the test audio is captured by the first sound sensor module 103. The noise reduction circuit 105 obtains a capture audio signal captured by the first sound sensor module 103, and determines the transfer function h3' based on the test audio signal and the capture audio signal. For example, assuming that the test audio signal is Y1 and that the capture audio signal is Y2, h3'=Y2/Y1. Apparently, the noise reduction circuit 105 can measure h3' by controlling the speaker 102 to send the test audio signal. The measurement of h3' is simple to implement, and does not affect noise reduction performance of the noise reduction circuit 105.

In some exemplary embodiments, considering that h3 is usually related to a wearing pose of the acoustic device 100, the corresponding h3 may vary when the same acoustic device 100 is worn by different users, and the corresponding h3 may also vary when the same acoustic device is worn by the same user many times. Therefore, when detecting that the acoustic device 100 is powered on or detecting that the acoustic device 100 is worn by the user, the noise reduction circuit 105 can perform the foregoing measurement process to improve accuracy of h3'.

In some exemplary embodiments, after h3' is measured, the noise reduction circuit 105 may generate the quasi-ambient noise signal in the following manner: The noise reduction circuit 105 obtains an input signal (that is, S3) corresponding to the speaker 102, and provides a first gain for the input signal (S3) to obtain a first gain signal, where the first gain is h3'. Therefore, the first gain signal is S3*h3'. Then the noise reduction circuit 105 obtains the first sound signal (that is, S1=S0*h1+S3*h3) from the first sound sensor module 103, and subtracts the first gain signal from the first sound signal to obtain the quasi-ambient noise signal. The quasi-ambient noise signal may be expressed as: S1'=S0*h1+S3*h3−S3*h3'.

S13. Generate a first noise cancellation signal based on the quasi-ambient noise signal.

In some exemplary embodiments, with continued reference to FIG. 5, the noise reduction circuit 105 may input the quasi-ambient noise signal S1' into the feedforward filter (h5), and filter the quasi-ambient noise signal (S1') by using the feedforward filter, to obtain the first noise cancellation signal. The feedforward filter is configured to adjust at least one of a gain or phase of the quasi-ambient noise signal (S1'), so that the obtained first noise cancellation signal can cancel at least a part of ambient noise in a space at and/or near the eardrum 202. It should be understood that the feedforward filter may be an ideal feedforward filter, that is, an ideal amplitude-phase response of the feedforward filter may be designed based on the formula (6).

S14. Send the first noise cancellation signal to the speaker, so that the speaker converts the first noise cancellation signal into a first noise cancellation audio to reduce volume of the ambient noise at the eardrum.

As described above, the noise reduction circuit 105 is communicatively connected to the speaker 102. After generating the first noise cancellation signal, the noise reduction circuit 105 may send the first noise cancellation signal to the speaker 102. In this way, the speaker 102 plays the first noise cancellation audio corresponding to the first noise cancellation signal, so that the first noise cancellation audio cancels or partially cancels the ambient noise at the eardrum 202, thereby achieving a noise reduction objective.

Figure 6:
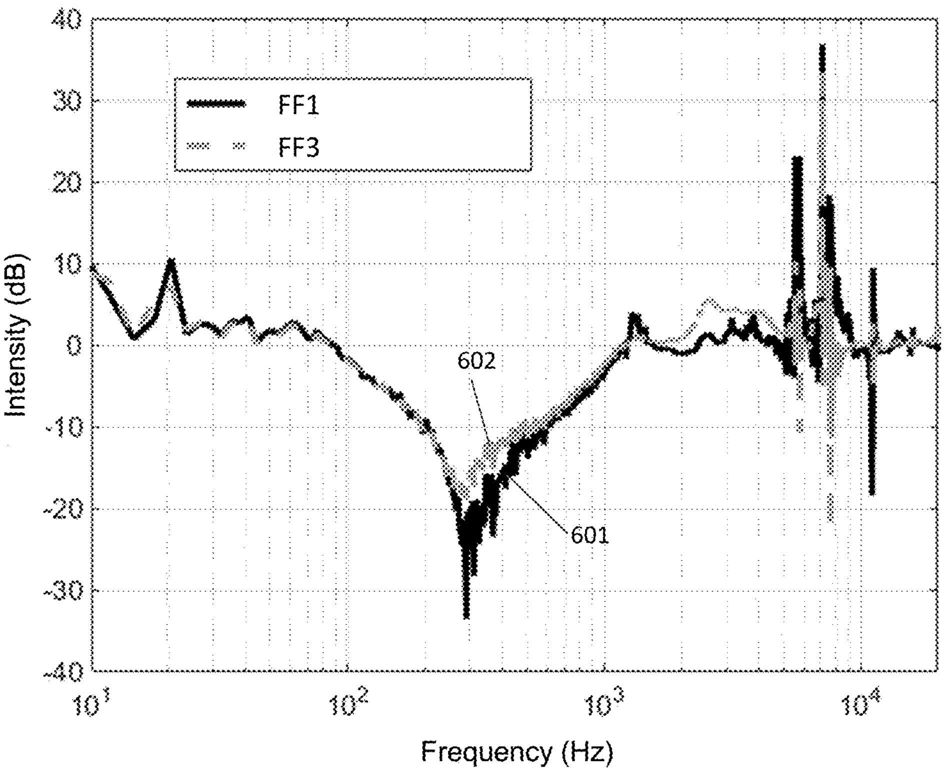
FIG. 6 is a schematic diagram of a noise reduction effect of an active noise reduction method according to some exemplary embodiments of the present disclosure.

FIG. 6 is a schematic diagram of a noise reduction effect of the active noise reduction method according to some exemplary embodiments of the present disclosure. As shown in FIG. 6, curves 601 and 602 correspond to noise reduction results in two test scenarios. A test process corresponding to the curve 601 is as follows: The noise reduction circuit 105 obtains the first sound signal captured by FF1 (located at an acoustic null point of the speaker 102) in FIG. 3, where the first sound signal does not include or basically does not include the leakage signal from the speaker 102). The noise reduction circuit 105 performs feedforward noise reduction based on the first sound signal by using the ideal feedforward filter, to obtain the noise reduction result shown in the curve 601. A test process corresponding to the curve 602 is as follows: The noise reduction circuit 105 obtains the first sound signal captured by FF3 (not located at an acoustic null point of the speaker 102, or located beyond an acoustic null point of the speaker 102) in FIG. 3, where the first sound signal includes the leakage signal from the speaker 102. The noise reduction circuit 105 uses the active noise reduction method shown in FIG. 4. The noise reduction circuit 105 first reduces the components of the leakage signal in the first sound signal to obtain the quasi-ambient noise signal, and then performs feedforward noise reduction based on the quasi-ambient noise signal by using the ideal feedforward filter. As can be learned from FIG. 6, the two noise reduction results in the curve 601 and the curve 602 are substantially consistent. Therefore, it can be learned that the noise reduction circuit 105 can effectively improve the noise reduction effect of the open acoustic device by first reducing the components of the leakage signal in the first sound signal to obtain the quasi-ambient noise signal, and then generating the first noise cancellation signal based on the quasi-ambient noise signal.

In the active noise reduction method P100 shown in FIG. 4 above, after obtaining the first sound signal from the first sound sensor module, the noise reduction circuit 105 first reduces the components of the leakage signal from the first sound signal to generate the quasi-ambient noise signal, and then performs feedforward noise reduction based on the quasi-ambient noise signal to generate the first noise cancellation signal. In some exemplary embodiments, the noise reduction circuit 105 can interchange the step of the component reduction and the step of feedforward noise reduction. Specifically, after obtaining the first sound signal (S1) from the first sound sensor module, the noise reduction circuit 105 first performs feedforward noise reduction (h5) on the first sound signal to generate an intermediate noise cancellation signal (S1*h5). Because the first sound signal includes the ambient noise signal and the leakage signal, when the noise reduction circuit 105 performs feedforward noise reduction on the first sound signal, the noise reduction circuit 105 performs feedforward noise reduction on the ambient noise signal and the leakage signal simultaneously. In this way, the obtained intermediate noise cancellation signal (S1*h5) includes both a feedforward noise reduction result of the ambient noise signal and a feedforward noise reduction result of the leakage signal. The feedforward noise reduction result of the leakage signal may be estimated in the following manner: obtaining the input signal (S3) corresponding to the speaker, and providing the first gain (h3') for the input signal to obtain the first gain signal (S3*h3'). It should be understood that the first gain signal (S3*h3') may be considered as an estimate of the leakage signal. Based on a feedforward noise reduction parameter (h5), the first gain signal (S3*h3') is filtered to obtain a filtering result (S3*h3'*h5) of the leakage signal. Further, the feedforward noise reduction result (S3*h3'*h5) of the leakage signal is subtracted from the intermediate noise cancellation signal (S1*h5) to obtain the first noise cancellation signal (S1*h5−S3*h3'*h5). It should be noted that, in the foregoing manner, h3' is the transfer function from the speaker to the first sound sensor module. For the manner of measuring h3', reference may be made to the related content above. Details are not described herein again.

In summary, in the active noise reduction method P100 provided in the present disclosure, in the case that the first sound signal includes both the ambient noise signal and the leakage signal, the noise reduction circuit 105 may first generate the quasi-ambient noise signal by reducing the components of the leakage signal in the first sound signal, then generate the first noise cancellation signal based on the quasi-ambient noise signal, and then convert the first noise cancellation signal into the first noise cancellation audio by using the speaker, thereby achieving the noise reduction objective. In the feedforward noise reduction process, the noise reduction circuit 105 reduces the components of the leakage signal in the first sound signal to reduce impact of the leakage signal on feedforward noise reduction. Therefore, the noise reduction effect of active noise reduction can be improved.

Generally, in the noise reduction circuit 105, "minimizing the ambient noise (S4) at the eardrum 202" should be used as a noise reduction objective to design or adjust a noise reduction parameter of the noise reduction circuit 105. In a closed acoustic device, the second sound signal (S2) captured by the second sound sensor module 104 is equal or approximately equal to the ambient noise (S4) at the eardrum 202. Therefore, in the closed acoustic device, "minimizing the second sound signal (S2)" may be used as a noise reduction objective. However, in the open acoustic device, the second sound signal (S2) measured by the second sound sensor module 104 is no longer equal or approximately equal to the ambient noise (S4) at the eardrum 202 due to an open space formed between the speaker 102 and the eardrum 202.

During research of the present disclosure, it is found that reasons why S2 and S4 are no longer equal or approximately equal are as follows: With reference to the acoustic transfer process shown in FIG. 5, the second sound signal (S2) measured by the second sound sensor module 104 may be expressed as the formula (3), and the ambient noise (S4) at the eardrum 202 may be expressed as the formula (0), as follows:

$$S2 = S3 * h4 + S0 * h2 \quad \text{formula (3)}$$

$$S4 = S3 * h7 + S9 * h8 \quad \text{formula (0)}$$

As can be learned from the formulas (3) and (0), both S2 and S4 may be considered as mixed signals of two sound signals, where the first sound signal comes from the noise cancellation signal (S3) emitted by the speaker 102, and the second sound signal comes from the ambient noise signal (S0) emitted by the noise source 300. For the second sound signal, considering that normally in a band requiring noise reduction, the transfer function (h2) from the sound emitted by the noise source 300 to the audio signal measured by the second sound sensor module 104 is equal or approximately equal to the transfer function (h8) from the sound emitted by the noise source 300 to the eardrum 202, that is, h2≈h8, components of the second sound signal in S2 and S4 are similar, and a difference between S2 and S4 mainly comes from a difference between the components (S3*h4) of the noise cancellation signal in S2 and the components (S3*h7) of the noise cancellation signal in S4.

In the closed acoustic device, the transfer function (h4) from the sound emitted by the speaker 102 to the audio signal measured by the second sound sensor module 104 is equal or approximately equal to the transfer function (h7) from the sound emitted by the speaker 102 to the eardrum 202, that is, h4≈h7. Therefore, S2 obtained based on the formula (3) is also equal or approximately equal to S4 obtained based on the formula (0). However, in the open acoustic device, the transfer function (h4) from the sound emitted by the speaker 102 to the audio signal measured by the second sound sensor module 104 is no longer equal or approximately equal to the transfer function (h7) from the sound emitted by the speaker 102 to the eardrum 202. Therefore, S2 obtained based on the formula (3) is no longer equal or approximately equal to S4 obtained based on the formula (0) either.

It can be understood that because S2 and S4 are no longer equal or approximately equal in the open acoustic device, the noise reduction effect is poor if "minimizing S2" is still used as the noise reduction objective.

To resolve the foregoing technical problem, the inventor of the present disclosure proposes the following technical idea during research: The structure of the acoustic device 100 and positions of various components are specially designed, so that S4 can be estimated based on S2, although S4 and S2 are not equal (or S4 and S2 tend to be the same). In this way, S4 can be estimated based on S2, and active noise reduction can be performed by using "minimizing S4" as the noise reduction objective. Alternatively, a noise reduction parameter required for using "minimizing S4" as the noise reduction objective can be derived based on a noise reduction parameter required for using "minimizing S2" as the noise reduction objective, to improve the effect of active noise reduction.

Based on the foregoing analysis, the difference between S4 and S2 mainly comes from the difference between the components (S3*h4) of the noise cancellation signal in S2 and the components (S3*h7) of the noise cancellation signal in S4. To estimate S4 based on S2, a common consideration is that h4 and h7 need to be learned separately. However, during research, the inventor finds that both h7 and h4 are quantities strongly related to the pose of the acoustic device 100. To be specific, both h4 and h7 vary in a case where the acoustic device is worn by different users, and both h4 and h7 may vary even in a case where the acoustic device is worn by the same user many times. In addition, because there is no sound sensor at the eardrum 202 of the user in an actual application scenario, the measurement of h7 is difficult, causing great difficulty in estimation of S4. Through further research, the inventor finds that although both h4 and h7 are strongly related to the pose of the acoustic device 100, the positions of the second sound sensor module 104 and the speaker 102 may be designed, so that a first preset relationship is satisfied between h4 and h7 and that the first preset relationship is independent of the pose of the acoustic device 100. That the first preset relationship is independent of the pose of the acoustic device 100 means that the first preset relationship is satisfied between h4 and h7 regardless of a posture in which the acoustic device 100 is worn by the user. For example, when the acoustic device 100 is worn by different users, the first preset relationship is satisfied between h4 and h7. In another example, when the acoustic device 100 is worn by the same user many times, the first preset relationship is satisfied between h4 and h7.

A specific form of the first preset relationship is not limited in the present disclosure. At a design stage of the acoustic device 100, the first preset relationship between h4 and h7 may be obtained by testing a process of wearing the acoustic device by a large quantity of users many times. In some exemplary embodiments, the first preset relationship may be h7/h4=h9. It should be noted that a value of h9 is not limited in the present disclosure. It should be understood that, in a case where the first preset relationship is satisfied between h4 and h7, a relationship between S2 and S4 may be satisfied: The following relationship exists between the components (S3*h7) of the noise cancellation signal in S4 and the components (S3*h4) of the noise cancellation signal in S2: (S3*h7)/(S3*h4)=h9; or strength of the components (S3*h4) of the noise cancellation signal in S2 is x dB lower than strength of the components (S3*h7) of the noise cancellation signal in S4, where a value of x may be 1, 2, or any other value.

It should be noted that specific positions of the second sound sensor module 104 and the speaker 102 are not limited in the present disclosure, so long as the positions of the two can make the first preset relationship satisfied between h4 and h7 and the first preset relationship is independent of the pose of the acoustic device 100. In some exemplary embodiments, the speaker 102 may be disposed in a position close to the ear canal opening and a sound output surface (that is, a surface on which the sound output end is located) is oriented to the ear canal opening. For example, the speaker 102 can be disposed in a position of the acoustic device 100 that is close to the ear canal opening when the acoustic device 100 is worn in whatever pose due to distribution of the shape and mass of the acoustic device 100. The second sound sensor module 104 may be disposed on the sound output surface of the speaker 102. In addition, the following principles can be considered in the design of the specific position of the second sound sensor module 104 on the sound output surface: (1) A sound capture end of the second sound sensor module 104 is far away from the user's skin, and (2) the sound capture end of the second sound sensor module 104 is as close to the ear canal opening as possible. It should be understood that the positions of the speaker 102 and the second sound sensor module 104 determined in the foregoing manner can make h4 and h7 less susceptible to the wearing pose, that is, h4 and h7 satisfy the same first preset relationship regardless of the wearing pose of the acoustic device 100. In addition, the positions of the speaker 102 and the second sound sensor module 104 determined in the foregoing manner can further make the second sound signal S2 captured by the second sound sensor module 104 close to the ambient noise S4 at the eardrum 202, and the second sound signal S2 is not susceptible to skin reflection. In this way, S4 estimated based on the first preset relationship and the second sound signal S2 is more accurate.

In a case where the first preset relationship is satisfied between h4 and h7 and that the first preset relationship is independent of the pose of the acoustic device 100, the present disclosure provides an active noise reduction method P200, which can adjust the noise reduction parameter based on the second sound signal (S2) and the first preset relationship and improve an effect of active noise reduction regardless of the pose of the acoustic device 100 worn by the user. The active noise reduction method P200 may be applied independently to the acoustic device 100 provided in the present disclosure, or may be combined with other active noise reduction methods described in other parts of the present disclosure.

Figure 7:
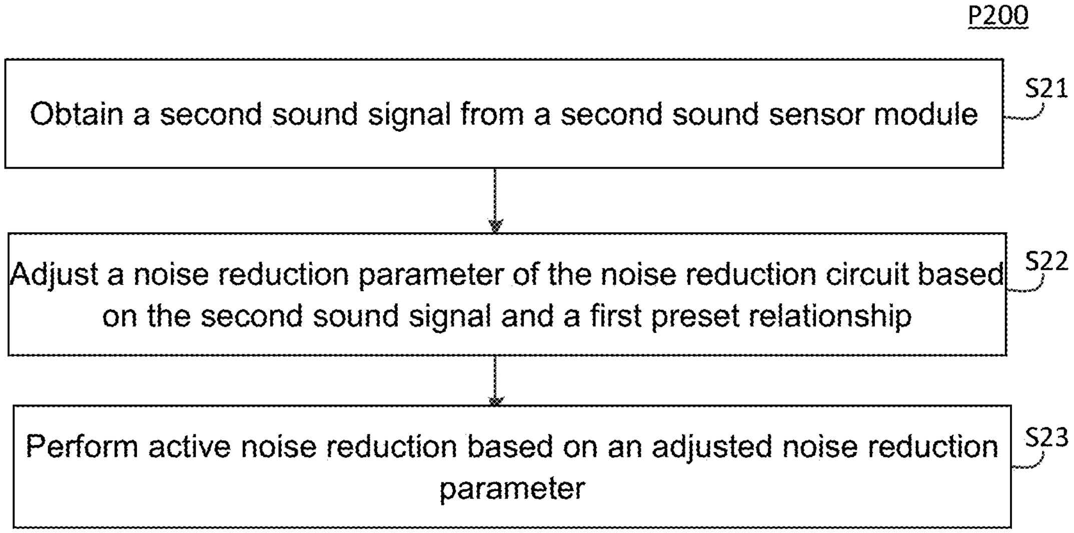
FIG. 7 is a flowchart of an active noise reduction method according to some exemplary embodiments of the present disclosure.

FIG. 7 is a flowchart of an active noise reduction method P200 according to some exemplary embodiments of the present disclosure. The active noise reduction method P200 may be performed by the noise reduction circuit 105 in the acoustic device 100. For example, the processor 107 in the noise reduction circuit 105 may read an instruction set stored in the local storage medium of the noise reduction circuit 105 and then perform, as instructed by the instruction set, the active noise reduction method P200 described in the present disclosure. As shown in FIG. 7, the active noise reduction method P200 may include the following steps.

S21. Obtain a second sound signal from a second sound sensor module.

S22. Adjust a noise reduction parameter of the noise reduction circuit based on the second sound signal and a first preset relationship.

In some exemplary embodiments, the noise reduction circuit 105 may determine ambient noise (S4) at an eardrum 202 based on the second sound signal (S2) and the first preset relationship. Then the noise reduction circuit 105 adjusts the noise reduction parameter by using "minimizing the ambient noise (S4) at the eardrum 202" as an objective.

In some exemplary embodiments, the noise reduction circuit 105 may estimate S4 in the following manner:

(1) Measure a first transfer function h4' from a sound emitted by the speaker 102 to an audio signal measured by the second sound sensor module 104.

In some exemplary embodiments, h4' may be measured in the following manner: The noise reduction circuit 105 sends a test audio signal to the speaker 102, so that the speaker 102 emits a corresponding test audio and that the test audio is captured by the second sound sensor module 104. The noise reduction circuit 105 obtains a capture audio signal captured by the second sound sensor module 104, and determines the first transfer function h4' based on the test audio signal and the capture audio signal. For example, assuming that the test audio signal is Y1 and that the capture audio signal is Y2, h4'=Y2/Y1. Apparently, the noise reduction circuit 105 can measure h4' by controlling the speaker 102 to send the test audio signal. The measurement of h4' is simple to implement, and does not affect noise reduction performance of the noise reduction circuit 105. In some exemplary embodiments, considering that h4 is usually related to a wearing pose of the acoustic device 100, the corresponding h4 may vary when the same acoustic device 100 is worn by different users, and the corresponding h4 may also vary when the same acoustic device is worn by the same user many times. Therefore, when detecting that the acoustic device 100 is powered on or detecting that the acoustic device 100 is worn by the user, the noise reduction circuit 105 can perform the foregoing measurement process to improve accuracy of h4'.

(2) Determine the ambient noise at the eardrum based on the first transfer function, the first preset relationship, and the second sound signal.

Specifically, a second transfer function h7' from the sound emitted by the speaker 102 to the eardrum 202 may be determined based on the first transfer function h4' and the first preset relationship.

For example, assuming that the first preset relationship is h7/h4=h9, the second transfer function h7'=h4'*h9 may be obtained based on the first transfer function h4' and the first preset relationship.

Further, based on the first transfer function h4', the second transfer function h7', and S2, S4 may be determined specifically as follows:

First, based on the formula (3), the following may be obtained:

$$S0 * h2 = S2 - S2 * h4 \quad \text{formula (12)}$$

Based on the foregoing analysis, components (S0*h2) of the ambient noise in S2 are approximately equal to components (S0*h8) of the ambient noise in S4, that is, $$S0 * h8 \approx S0 * h2 = S2 - S3 * h4 \quad \text{formula (13)}$$

Substituting the formula (13) into the formula (0) yields:

$$S4 \approx S3 * h7 + (S2 - S3 * h4) \quad \text{formula (14)}$$

In the formula (14), S3 is an input signal of the speaker 102, h4 may be replaced with the first transfer function h4', h7 may be replaced with the second transfer function h7', and S2 is the second sound signal captured by the second sound sensor module 104. Therefore, the noise reduction circuit 105 can estimate S4 based on the first transfer function h4', the second transfer function h7', the second sound signal S2, and the input signal S3 of the speaker 102.

In the foregoing active noise reduction process, based on the second sound signal ( ) and the first preset relationship, the ambient noise ( ) at the eardrum 202 is first determined, and then "minimizing the ambient noise ( ) at the eardrum 202" is used as the noise reduction objective to improve accuracy of the noise reduction objective and improve the effect of active noise reduction.

In the foregoing embodiment, S4 is determined based on the following assumption: A transfer function (h2) from a sound emitted by the noise source 300 to an audio signal measured by the second sound sensor module 104 is approximately equal to a transfer function (h8) from the sound emitted by the noise source 300 to the eardrum 202, that is, h2≈h8. The inventor considers that h2 and h8 are usually not strictly equal in an actual application scenario, and the unequal relationship causes an error in S4 determined in the foregoing embodiment. Therefore, to further improve accuracy of S4, h2 and h8 can also be considered in the process of determining S4. However, h2 and h8 are also quantities related to the pose of the acoustic device 100. Both h2 and h8 vary in a case where the acoustic device is worn by different users, and both h2 and h8 may vary even in a case where the acoustic device is worn by the same user many times. Therefore, it is difficult to measure h2 and h8 separately. After further research, the inventor finds that in the design of the positions of the second sound sensor module 104 and the speaker 102, not only the first preset relationship is satisfied between h4 and h7, but also the second preset relationship may be satisfied between h2 and h8, and the second preset relationship is independent of the pose of the acoustic device 100. That the second preset relationship is independent of the pose of the acoustic device 100 means that the second preset relationship is satisfied between h2 and h8 regardless of a posture in which the acoustic device 100 is worn by the user. For example, when the acoustic device 100 is worn by different users, the second preset relationship is satisfied between h2 and h8. In another example, when the acoustic device 100 is worn by the same user many times, the second preset relationship is satisfied between h2 and h8.

A specific form of the second preset relationship is not limited in the present disclosure. At a design stage of the acoustic device 100, a relationship between h2/h1 and h8/h1 may be obtained by testing a process of wearing the acoustic device by a large quantity of users many times, and the second preset relationship between h2 and h8 may be obtained based on this relationship. In some exemplary embodiments, the second preset relationship may be h8/h2=h10. It should be noted that a value of h10 is not limited in the present disclosure. It should be understood that in a case where the second preset relationship is satisfied between h2 and h8, the following relationship may be satisfied between S2 and S4. The following relationship exists between components (S0*h8) of an ambient noise signal in S4 and components (S0*h2) of an ambient noise signal in S2: (S0*h8)/(S0*h2)=h10; or strength of components (S0*h2) of an ambient noise signal in S2 is y dB lower than strength of components (S0*h8) of an ambient noise signal in S4, where a value of y may be 1, 2, or any other value.

In some exemplary embodiments, in a case where the first preset relationship is satisfied between h4 and h7, and that the second preset relationship is satisfied between h2 and h8, and that the first preset relationship and the second preset relationship are both independent of the pose of the acoustic device 100, S4 may be estimated based on the first preset relationship, the second preset relationship, and S2. A specific manner is as follows:

(1) Measure the first transfer function h4' from the sound emitted by the speaker 102 to the audio signal measured by the second sound sensor module 104. For a process of measuring the first transfer function h4', reference may be made to the foregoing description of related content. Details are not described herein again.

(2) Determine the ambient noise at the eardrum based on the first transfer function, the first preset relationship, the second preset relationship, and the second sound signal.

Specifically, the second transfer function h7' from the sound emitted by the speaker 102 to the eardrum 202 may be determined based on the first transfer function h4' and the first preset relationship. For a process of determining the second transfer function h7', reference may be made to the foregoing description of related content. Details are not described herein again.

Further, based on the second preset relationship, the first transfer function h4', the second transfer function h7', and S2, S4 may be determined specifically as follows:

First, based on the formula (3), the following may be obtained:

$$S0*h2=S2-S2*h4 \qquad \text{formula (12)}$$

Based on the second preset relationship, the following may be obtained:

$$S0*h8=S0*h2*h10=(S2-S3*h4)*h10 \qquad \text{formula (15)}$$

Substituting the formula (15) into the formula (0) yields:

$$S4=S3*h7+(S2-S3*h4)*h10 \qquad \text{formula (16)}$$

In the formula (16), S3 is an input signal of the speaker 102, h4 may be replaced with the first transfer function h4', h7 may be replaced with the second transfer function h7', S2 is the second sound signal captured by the second sound sensor module 104, and h10 may be obtained based on the second preset relationship. Therefore, S4 can be determined based on the first transfer function h4', the second transfer function h7', the second preset relationship, the second sound signal S2, and the input signal S3 of the speaker 102.

After S4 is estimated, "minimizing S4" may be used as the noise reduction objective to adjust the noise reduction parameter of the noise reduction circuit 105. In some exemplary embodiments, the noise reduction circuit 105 may include a feedforward filter. In this case, the noise reduction parameter may include a filter parameter of the feedforward filter. In some exemplary embodiments, the noise reduction circuit 105 may include a feedback filter. In this case, the noise reduction parameter may include a filter parameter of the feedback filter. In some exemplary embodiments, the noise reduction circuit 105 may include a feedforward filter and a feedback filter. In this case, the noise reduction parameter may include at least one of a filter parameter of the feedforward filter or a filter parameter of the feedback filter.

In some exemplary embodiments, the filter parameter of the feedforward filter or the feedback filter may include at least one of a filter gain, a filter phase, or a quality factor. The quality factor may be expressed as a ratio of a center frequency F (unit: Hz) of the filter to a bandwidth B (unit: Hz) of −3 dB, that is, the quality factor Q=F/B, which describes a capability of separating adjacent frequency components in a signal by the filter. If the quality factor is higher, it indicates that the filter has a higher capability of distinguishing adjacent frequency components.

In some exemplary embodiments, the noise reduction parameter of the noise reduction circuit 105 may include a filter gain of the feedforward filter. In this case, for ease of description, a filter gain of the feedforward filter required for using "minimizing the second sound signal (S2)" as the noise reduction objective is referred to as a first filter gain, and a filter gain of the feedforward filter required for using "minimizing the ambient noise (S4) at the eardrum 202" as the noise reduction objective is referred to as a second filter gain. In this case, when the first preset relationship is satisfied between h4 and h7, a relationship exists between signal strength of S2 and signal strength of S4. For example, the signal strength of S2 is x dB lower than the signal strength of S4. In this case, this relationship is also satisfied between the first filter gain and the second filter gain.

Figure 8A:
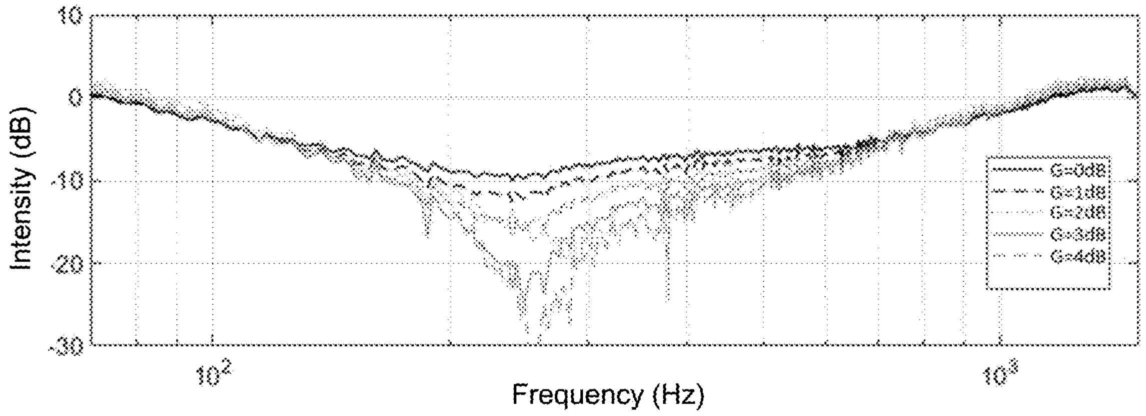
FIG. 8A is a schematic diagram of a frequency response curve of feedforward noise reduction performed on ambient noise at an eardrum by using different feedforward filter gains in a case where a first user wears an acoustic device.
Figure 8B:
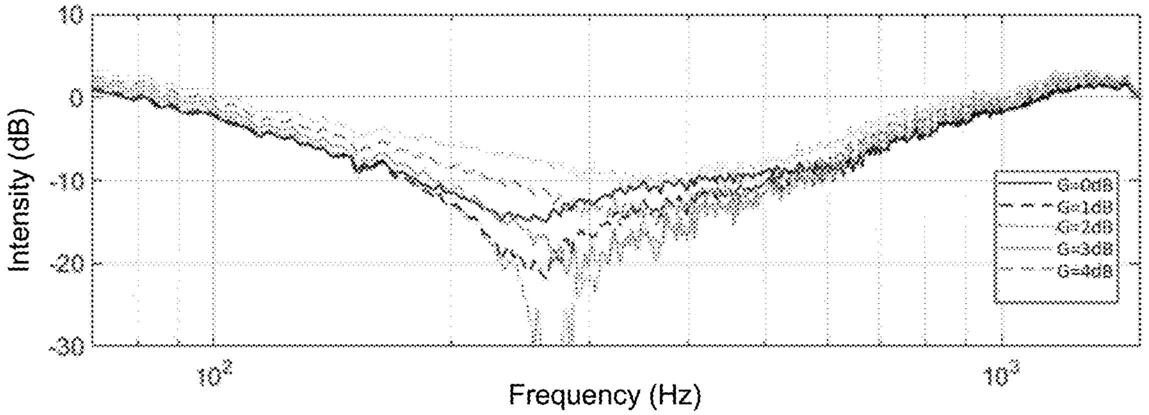
FIG. 8B is a schematic diagram of a frequency response curve of feedforward noise reduction performed on a second sound signal by using different feedforward filter gains in a case where a first user wears an acoustic device.

For example, FIG. 8A is a schematic diagram of a frequency response curve of feedforward noise reduction performed on ambient noise at an eardrum by using different feedforward filter gains in a case where a first user wears an acoustic device. FIG. 8B is a schematic diagram of a frequency response curve of feedforward noise reduction performed on a second sound signal by using different feedforward filter gains in a case where a first user wears an acoustic device. Assuming that the first preset relationship is satisfied between h4 and h7, strength of the second sound signal (S2) is 2 dB lower than strength of the ambient noise (S4) at the eardrum 202.

Referring to FIG. 8A and FIG. 8B, when the acoustic device 100 is worn by the first user, the feedforward filter in the noise reduction circuit 105 performs active noise reduction by using different filter gains (increasing from 0 dB to 4 dB successively) separately. Given different filter gains, a frequency response curve of feedforward noise reduction performed based on the ambient noise (S4) at the eardrum 202 is shown in FIG. 8A. Given different filter gains, a frequency response curve of feedforward noise reduction performed based on the second sound signal (S2) is shown in FIG. 8B. It can be learned from FIG. 8A that if the noise reduction objective is to minimize the ambient noise (S4) at the eardrum 202, the second filter gain required by the feedforward filter is 4 dB. It can be learned from FIG. 8B that if the noise reduction objective is to minimize the second sound signal (S2), the first filter gain required by the feedforward filter is 2 dB.

Figure 9A:
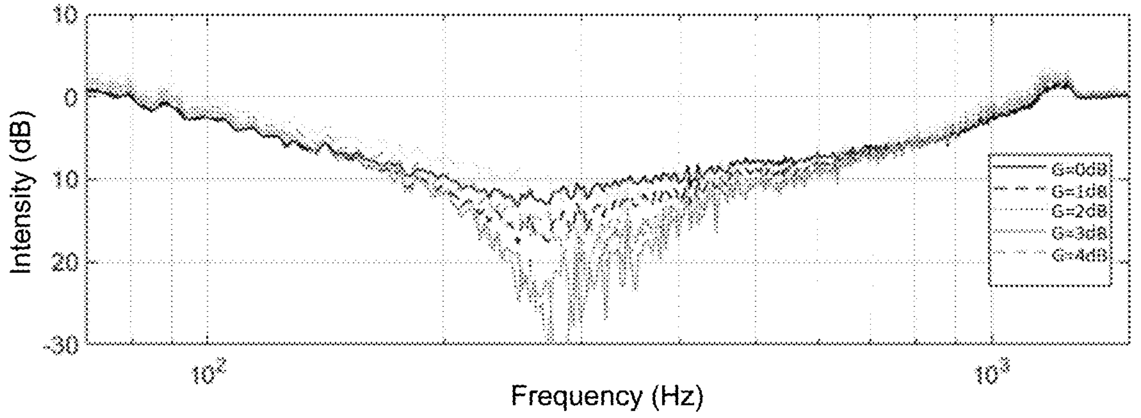
FIG. 9A is a schematic diagram of a frequency response curve of feedforward noise reduction performed on ambient noise at an eardrum by using different feedforward filter gains in a case where a second user wears an acoustic device.
Figure 9B:
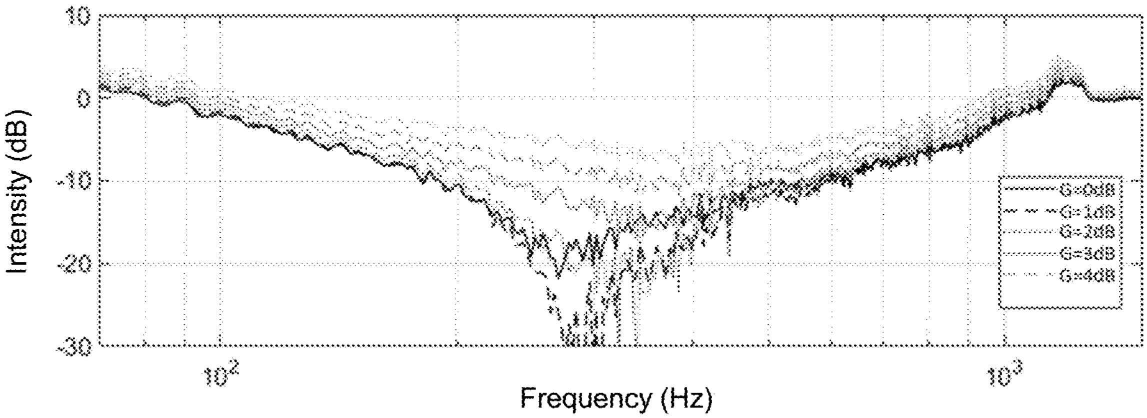
FIG. 9B is a schematic diagram of a frequency response curve of feedforward noise reduction performed on a second sound signal by using different feedforward filter gains in a case where a second user wears an acoustic device.

FIG. 9A is a schematic diagram of a frequency response curve of feedforward noise reduction performed on ambient noise at an eardrum by using different feedforward filter gains in a case where a second user wears an acoustic device. FIG. 9B is a schematic diagram of a frequency response curve of feedforward noise reduction performed on a second sound signal by using different feedforward filter gains in a case where a user B wears an acoustic device. Assuming that the first preset relationship is satisfied between h4 and h7, strength of the second sound signal (S2) is 2 dB lower than strength of the ambient noise (S4) at the eardrum 202.

Referring to FIG. 9A and FIG. 9B, when the acoustic device 100 is worn by the second user, the feedforward filter in the noise reduction circuit 105 performs active noise reduction by using different filter gains (increasing from 0 dB to 4 dB successively) separately. Given different filter gains, a frequency response curve of feedforward noise reduction performed based on the ambient noise (S4) at the eardrum 202 is shown in FIG. 9A. Given different filter gains, a frequency response curve of feedforward noise reduction performed based on the second sound signal (S2) is shown in FIG. 9B. It can be learned from FIG. 9A that if the noise reduction objective is to minimize the ambient noise (S4) at the eardrum 202, the second filter gain required by the feedforward filter is 3 dB. It can be learned from FIG. 8B that if the noise reduction objective is to minimize the second sound signal (S2), the first filter gain required by the feedforward filter is 1 dB.

From FIG. 8A to FIG. 9B, it can be learned that "a relationship between the first filter gain and the second filter gain" is the same as "a relationship between the strength of the second sound signal (S2) and the strength of the ambient noise (S4) at the eardrum 202". In other words, if the strength of the second sound signal (S2) is x dB lower than the strength of the ambient noise (S4) at the eardrum 202, the first filter gain is x dB lower than the second filter gain.

Therefore, the noise reduction circuit 105 can further adjust the filter gain of the feedforward filter in the following manner: First, "minimizing the second sound signal (S2)" is used as the noise reduction objective to determine the first filter gain of the feedforward filter. Then the noise reduction circuit 105 determines the second filter gain based on the first filter gain and the first preset relationship, and adjusts a current filter gain of the feedforward filter to the second filter gain. For example, it is assumed that the first preset relationship makes the strength of the second sound signal (S2) 2 dB lower than the strength of the ambient noise (S4) at the eardrum 202. The noise reduction circuit 105 first uses "minimizing the second sound signal (S2)" as the noise reduction objective to determine that the first filter gain is 2 dB. Then the noise reduction circuit 105 may add 2 dB to the first filter gain to obtain a second filter gain of 4 dB. Therefore, the current filter gain of the feedforward filter is adjusted to 4 dB.

In some exemplary embodiments, the acoustic device 100 may provide a plurality of working modes for the user. In each working mode, the noise reduction circuit 105 has a corresponding default noise reduction parameter, and different working modes correspond to different default noise reduction parameters. In some exemplary embodiments, an interactive control may be provided on the acoustic device 100, and the user may switch between different working modes by operating the interactive control. In some exemplary embodiments, the acoustic device 100 may provide an interactive interface, and the interactive interface may be presented on a screen of the acoustic device 100 or presented on a target device communicatively connected to the acoustic device 100. The user may select different working modes through the interactive interface. In some exemplary embodiments, the plurality of working modes correspond to different types of environments. The user can interactively indicate, to the acoustic device 100, a type of environment in which the user is currently located, and then the noise reduction circuit 105 can switch to a corresponding working mode based on the type of the environment in which the user is currently located. In some exemplary embodiments, the plurality of working modes may correspond to different user types. The user can interactively indicate a user type of the user to the acoustic device 100, and then the noise reduction circuit 105 can switch to a corresponding working mode based on the user type of the user.

In this way, in S22, the noise reduction circuit 105 can obtain a target working mode indicated by the user among the plurality of working modes, and then adjust, based on the second sound signal (S2) and the first preset relationship, a default noise reduction parameter corresponding to the target working mode. It should be understood that the acoustic device 100 can satisfy noise reduction requirements of different users or noise reduction requirements in different environments by providing the plurality of working modes.

S23. Perform active noise reduction based on an adjusted noise reduction parameter.

In some exemplary embodiments, the noise reduction circuit 105 may further obtain a first sound signal from the first sound sensor module and filter at least one of the first sound signal or the second sound signal based on the adjusted noise reduction parameter to generate a noise cancellation signal. Then the noise reduction circuit 105 sends the noise cancellation signal to the speaker, so that the speaker converts the noise cancellation signal into a noise cancellation audio to reduce volume of the ambient noise at the eardrum.

In some exemplary embodiments, when the acoustic device 100 works in a feedforward noise reduction mode, the noise reduction circuit 105 may filter the first sound signal based on the adjusted noise reduction parameter to generate the noise cancellation signal. For example, the noise reduction circuit 105 may input the first sound signal into the feedforward filter, and filter the first sound signal by using the feedforward filter, to obtain the noise cancellation signal. In some exemplary embodiments, when the first sound signal includes both an ambient noise signal and a leakage signal, the noise reduction circuit 105 may first generate a quasi-ambient noise signal by reducing components of the leakage signal in the first sound signal, and then filter the quasi-ambient noise signal based on the adjusted noise reduction parameter to obtain the noise cancellation signal. On one hand, because accuracy of the noise reduction objective is ensured when the noise reduction parameter is adjusted, active noise reduction based on the adjusted noise reduction parameter can improve the effect of active noise reduction. On the other hand, reducing the components of the leakage signal in the first sound signal reduces impact of the leakage signal on the feedforward noise reduction process and can further improve the effect of active noise reduction.

In some exemplary embodiments, when the acoustic device 100 works in a feedback noise reduction mode, the noise reduction circuit 105 may filter the second sound signal based on the adjusted noise reduction parameter to generate the noise cancellation signal. For example, the noise reduction circuit 105 may input the second sound signal into the feedback filter, and filter the second sound signal by using the feedback filter, to obtain the noise cancellation signal.

In some exemplary embodiments, when the acoustic device 100 works in a hybrid noise reduction mode, the noise reduction circuit 105 may filter the first sound signal based on the adjusted noise reduction parameter to obtain a first noise cancellation signal. For example, the noise reduction circuit 105 inputs the first sound signal into the feedforward filter, and filters the first sound signal by using the feedforward filter, to obtain the first noise cancellation signal. The noise reduction circuit 105 may further filter the second sound signal based on the adjusted noise reduction parameter to obtain a second noise cancellation signal. For example, the noise reduction circuit 105 inputs the second sound signal into the feedback filter, and filters the second sound signal by using the feedback filter, to obtain the second noise cancellation signal. Further, the noise reduction circuit 105 combines the first noise cancellation signal and the second noise cancellation signal to obtain the noise cancellation signal. In some exemplary embodiments, in a case where the first sound signal includes both an ambient noise signal and a leakage signal, the noise reduction circuit 105 may first generate a quasi-ambient noise signal by reducing components of the leakage signal in the first sound signal, and then filter the quasi-ambient noise signal based on the adjusted noise reduction parameter to obtain the first noise cancellation signal. On one hand, because accuracy of the noise reduction objective is ensured when the noise reduction parameter is adjusted, active noise reduction based on the adjusted noise reduction parameter can improve the effect of active noise reduction. On the other hand, reducing the components of the leakage signal in the first sound signal reduces impact of the leakage signal on the feedforward noise reduction process and can further improve the effect of active noise reduction.

In summary, in the active noise reduction method P200 provided in the present disclosure, the first preset relationship is satisfied between the acoustic transfer function (h4) from the sound emitted by the speaker 102 to the audio signal measured by the second sound sensor module 104 and the acoustic transfer function (h7) from the sound emitted by the speaker 102 to the eardrum 202, and the first preset relationship is independent of the pose of the acoustic device 100. Therefore, the noise reduction circuit 105 can adjust the noise reduction parameter based on the second sound signal (S2) and the first preset relationship, and perform active noise reduction based on the adjusted noise reduction parameter. Because the noise reduction circuit 105 adjusts the noise reduction parameter based on the second sound signal (S2) and the first preset relationship, the adjusted noise reduction parameter complies with the most essential noise reduction objective and can improve the noise reduction effect of active noise reduction.

As described above, in some exemplary embodiments, the first sound sensor module 103 may include one sound sensor. In this case, because the ambient noise may come from any direction, it is possible that the ambient noise reaches the speaker 102 or the eardrum 202 before it reaches the sound sensor. For example, assuming that the sound sensor is disposed on a first side of the acoustic device 100 (for example, one side facing the front of the user) and that the noise source 300 is located on a second side of the acoustic device 100 (for example, one side facing the rear of the user), because the sound sensor is far away from the noise source 300, the ambient noise emitted by the noise source 300 reaches the speaker 102 or the eardrum 202 before being captured by the sound sensor. Therefore, causality of feedforward noise reduction performed by the noise reduction circuit 105 becomes worse, which makes a noise reduction effect of feedforward noise reduction worse, especially a feedforward noise reduction effect in some bands (such as a mid-band and a high band), and may even lead to an increase of noise heard by a human ear.

Therefore, in some exemplary embodiments, the first sound sensor module 103 may include a plurality of sound sensors. For ease of description, a quantity of sound sensors included in the first sound sensor module 103 is denoted as N, where N is an integer greater than or equal to 2. The N sound sensors are physically connected to the support member 101, and distributed on one side farther away from the eardrum than the speaker 102. Without regard to leakage of the speaker 102, each sound sensor is configured to capture ambient noise from the noise source 300 and generate an ambient noise signal. For a purpose of distinguishing, in the following description, an ambient noise signal captured by each sound sensor is referred to as an individual ambient noise signal, and an ambient noise signal captured by the first sound sensor module 103 is referred to as an integrated ambient noise signal.

The N sound sensors are oriented differently with respect to a target point on the speaker 102. In some exemplary embodiments, the target point may be a center point or a sound output point on the speaker 102. Because the N sound sensors are oriented differently with respect to the target point, when ambient noise comes from different directions, at least one of the N sound sensors can capture the ambient noise earlier than the speaker 102.

Figure 10:
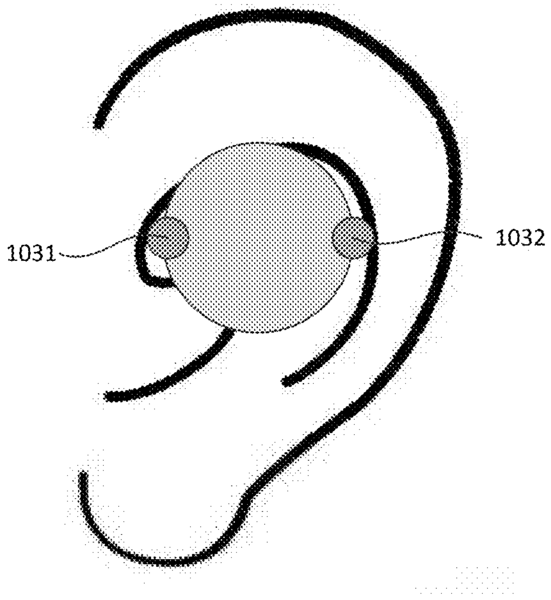
FIG. 10 is a schematic diagram of distribution of sound sensors in a case where two sound sensors are included in a first sound sensor module.

In some exemplary embodiments, N=2. FIG. 10 is a schematic diagram of distribution of sound sensors in a case where two sound sensors are included in a first sound sensor module. As shown in FIG. 10, when N=2, the first sound sensor module 103 may include a sound sensor 1031 and a sound sensor 1032. The two sound sensors may be located on two sides of the acoustic device 100 facing opposite directions, or the two sound sensors may be in opposite directions with respect to the target point. For example, when the acoustic device 100 is worn on the user's head, the sound sensor 1031 is located on the first side of the acoustic device 100 facing the front of the user, and the sound sensor 1032 is located on the second side of the acoustic device 100 facing the rear of the user. Therefore, when ambient noise is emitted by a noise source in front of the user, a phase of the ambient noise reaching the sound sensor 1031 (or a phase of an individual ambient noise signal measured by the sound sensor 1031) is ahead of a phase of the ambient noise reaching the sound output end of the speaker 102. When ambient noise is emitted by a noise source behind the user, a phase of the ambient noise reaching the sound sensor 1032 (or a phase of an individual ambient noise signal measured by the sound sensor 1032) is ahead of a phase of the ambient noise reaching the sound output end of the speaker 102. In some exemplary embodiments, the two sound sensors may be located at acoustic null points of the speaker 102. Therefore, signals captured by the two sound sensors do not include any leakage signal from the speaker 102, thereby improving the effect of the active noise reduction.

Figure 11:
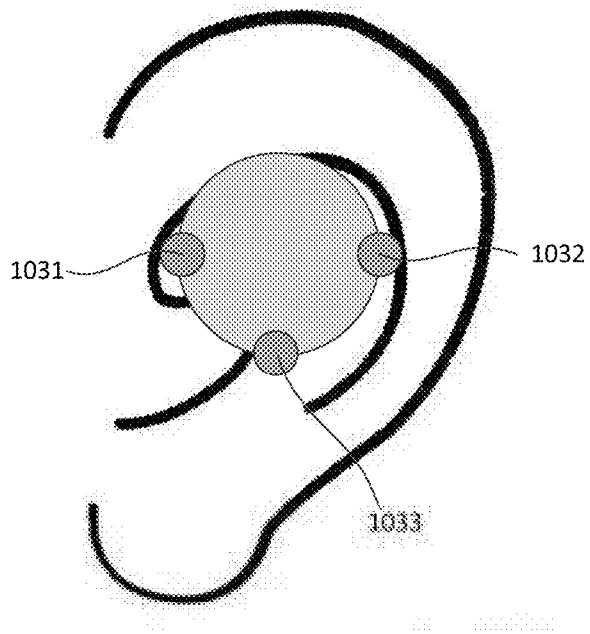
FIG. 11 is a schematic diagram of distribution of sound sensors in a case where three sound sensors are included in a first sound sensor module.

In some exemplary embodiments, N=3. FIG. 11 is a schematic diagram of distribution of sound sensors in a case where three sound sensors are included in a first sound sensor module. As shown in FIG. 11, when N=3, the first sound sensor module 103 may include a sound sensor 1031, a sound sensor 1032, and a sound sensor 1033. The three sound sensors may be located on three sides of the acoustic device 100 facing different directions. For example, when the acoustic device 100 is worn on the user's head, the sound sensor 1031 is located on the first side of the acoustic device 100 facing the front of the user, the sound sensor 1032 is located on the second side of the acoustic device 100 facing the rear of the user, and the sound sensor 1033 is located on the third side of the acoustic device 100 facing the ground. Therefore, when ambient noise is emitted by a noise source in front of the user, a phase of the ambient noise reaching the sound sensor 1031 (or a phase of an individual ambient noise signal measured by the sound sensor 1031) is ahead of a phase of the ambient noise reaching the sound output end of the speaker 102. When ambient noise is emitted by a noise source behind the user, a phase of the ambient noise reaching the sound sensor 1032 (or a phase of an individual ambient noise signal measured by the sound sensor 1032) is ahead of a phase of the ambient noise reaching the sound output end of the speaker 102. When ambient noise is emitted by a noise source below the acoustic device, a phase of the ambient noise reaching the sound sensor 1033 (or a phase of an individual ambient noise signal measured by the sound sensor 1033) is ahead of a phase of the ambient noise reaching the sound output end of the speaker 102. In some exemplary embodiments, the three sound sensors may be distributed at acoustic null points of the speaker 102 in a form of a triangle. Therefore, signals captured by the three sound sensors do not include any leakage signal from the speaker 102, thereby improving the effect of the active noise reduction.

It should be noted that FIG. 10 and FIG. 11 are only two possible distribution manners. In an actual design, the N sound sensors may be distributed in other manners. Details are not described herein. In addition, a value of N is not specifically limited in the present disclosure. For example, the value of N may be equal to 4, 5 or any other integer.

In some exemplary embodiments, the N sound sensors may be arranged in an array, such as a linear array, a planar array, a spherical array, or another array. The array arrangement also helps reduce complexity of signal processing in the noise reduction circuit 105 and further improve performance of active noise reduction.

At least some of the N sound sensors may be omnidirectional microphones. The omnidirectional microphone has high sensitivity to ambient noise in all directions and can capture ambient noise in any direction. At least some of the N sound sensors may be directional microphones. The directional microphone can capture ambient noise only in a specified direction. For example, as shown in FIG. 10, the sound sensor 1031 may be directed at the front of the user and configured to capture ambient noise coming from the front of the user, and the sound sensor 1032 may be directed at the rear of the user and configured to capture noise coming from the rear of the user. The directional microphone may include but is not limited to a cardioid microphone, a cardioid-like microphone, or any other directional microphone. Directivity of the directional microphone for different frequencies may be the same or different.

In a case where the first sound sensor module 103 includes N sound sensors, the present disclosure provides an active noise reduction method P300. When performing active noise reduction, the noise reduction circuit 105 can assign weights to the N sound sensors, so that the first sound sensor module 103 has a phase lead in any direction. The solution improves causality of feedforward noise reduction, and can further improve the effect of active noise reduction. The active noise reduction method P300 may be applied independently to the acoustic device 100 provided in the present disclosure, or may be combined with other active noise reduction methods described in other parts of the present disclosure.

Figure 12:
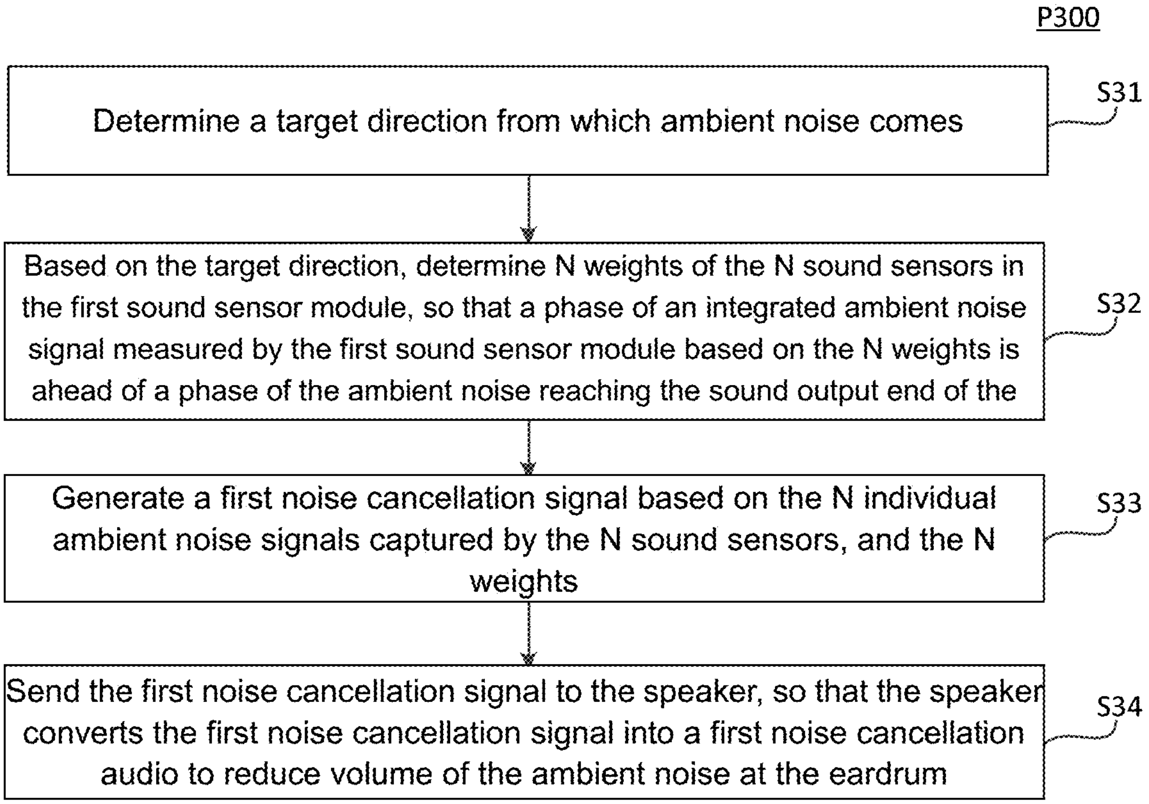
FIG. 12 is a flowchart of an active noise reduction method according to some exemplary embodiments of the present disclosure.

FIG. 12 is a flowchart of an active noise reduction method P300 according to some exemplary embodiments of the present disclosure. The active noise reduction method P300 may be performed by the noise reduction circuit 105 in the acoustic device 100. For example, when the noise reduction circuit 105 uses the structure shown in FIG. 2, the processor 107 in the noise reduction circuit 105 may read an instruction set stored in the local storage medium of the noise reduction circuit 105 and then perform, as instructed by the instruction set, the active noise reduction method P300 described in the present disclosure. As shown in FIG. 12, the active noise reduction method P300 may include the following steps.

S31. Determine a target direction from which ambient noise comes. The target direction is a direction from which the ambient noise comes, that is, a direction of the noise source 300. In some exemplary embodiments, a direction of a ray from a target point on the speaker 102 to the noise source 300 may be referred to as the target direction.

In some exemplary embodiments, the noise reduction circuit 105 may obtain N individual ambient noise signals captured by N sound sensors, and estimate, based on the N individual ambient noise signals, the target direction from which the ambient noise comes. In some exemplary embodiments, the noise reduction circuit 105 may obtain the target direction by performing full-band direction of arrival (Direction Of Arrival, DOA) analysis on the N individual ambient noise signals. In this case, the target direction represents a direction of arrival of full-band ambient noise (that is, overall ambient noise).

It should be noted that a DOA algorithm is not specifically limited in the present disclosure. For example, one or more of algorithms such as an estimating signal parameter via rotational invariance techniques (Estimating Signal Parameter via Rotational Invariance Techniques, ESPRIT) algorithm and a multiple signal classification (Multiple Signal Classification, MUSIC) algorithm may be used.

S32. Based on the target direction, determine N weights of the N sound sensors in the first sound sensor module, so that a phase of an integrated ambient noise signal measured by the first sound sensor module based on the N weights is ahead of a phase of the ambient noise reaching the sound output end of the speaker.

In some exemplary embodiments, the integrated ambient noise signal is a signal obtained by performing weighted summation on the N individual ambient noise signals captured by the N sound sensors based on the N weights.

With reference to FIG. 10, an example is used for description. The first sound sensor module 103 includes a sound sensor 1031 and a sound sensor 1032. An individual ambient noise signal captured by the sound sensor 1031 is $$A_0e^{j(\grave{}ut+\ddot{o}_1)},$$

and an individual ambient noise signal captured by the sound sensor 1032 is $$A_0e^{j(\grave{}ut+\ddot{o}_2)}.$$

Assuming that a weight of the sound sensor 1031 is $\acute{a}_1$ and that a weight of the sound sensor 1032 is $\acute{a}_2$, the integrated ambient noise signal measured by the first sound sensor module 103 based on the two weights may be expressed as:

$$\alpha_1A_0e^{j(\omega t+\varphi_1)}+\alpha_2A_0e^{j(\omega t+\varphi_2)}.$$

The phase of the integrated ambient noise signal may be expressed as:

$$\alpha_1e^{j\varphi_1}+\alpha_2e^{j\varphi_2}.$$

As can be learned, the noise reduction circuit 105 may set weights for the N sound sensors based on the target direction, so that the phase of the integrated noise signal is ahead of the phase of the ambient noise reaching the sound output end of the speaker 102.

In some exemplary embodiments, a weight corresponding to an ith sound sensor is related to a lead of a phase of an individual ambient noise signal captured by the ith sound sensor. For example, if the phase of the individual ambient noise signal captured by the ith sound sensor is ahead of the phase of the ambient noise reaching the sound output end of the speaker 102, the weight corresponding to the ith sound sensor is greater; or conversely, the weight corresponding to the ith sound sensor is smaller, where i is any positive integer less than or equal to N.

In some exemplary embodiments, assuming that an included angle between the target direction and a direction of the ith sound sensor with respect to the target point on the speaker 102 is $\grave{e}_i$, the weight corresponding to the ith sound sensor is negatively correlated with $\grave{e}_i$. In other words, if $\grave{e}_i$ is smaller (indicating a smaller deviation between the target direction and the direction of the sound sensor with respect to the target point), the weight is greater; or if $\grave{e}_i$ is larger (indicating a greater deviation between the target direction and the direction of the sound sensor with respect to the target point), the weight is smaller, where i is any positive integer less than or equal to N.

With reference to FIG. 10, an example is used for description. Assuming that the ambient noise comes from the front of the user, the weight of the sound sensor 1031 is greater than the weight of the sound sensor 1032. Therefore, during active noise reduction, the sound sensor 1031 plays a major role, and its phase lead can be ensured. Assuming that the ambient noise comes from the rear of the user, the weight of the sound sensor 1032 is greater than the weight of the sound sensor 1031. Therefore, during active noise reduction, the sound sensor 1032 plays a major role, and its phase lead can also be ensured.

S33. Generate a first noise cancellation signal based on the N individual ambient noise signals captured by the N sound sensors, and the N weights.

In some exemplary embodiments, the noise reduction circuit 105 may include N feedforward filters in a one-to-one correspondence with the N sound sensors. An ith feedforward filter is in communication with the ith sound sensor and the speaker 102, and configured to filter the individual ambient noise signal captured by the ith sound sensor, where i is any positive integer less than or equal to N. In other words, the N feedforward filters in the noise reduction circuit 105 are connected in parallel.

Because the N feedforward filters are connected in parallel, an increase of a filter order or a delay is not caused during active noise reduction. In addition, on this basis, the N feedforward filters connected in parallel also help increase complexity of filtering. For example, the N feedforward filters may be responsible for noise reduction in different bands, thereby enhancing a capability of feedforward noise reduction.

Figure 13:
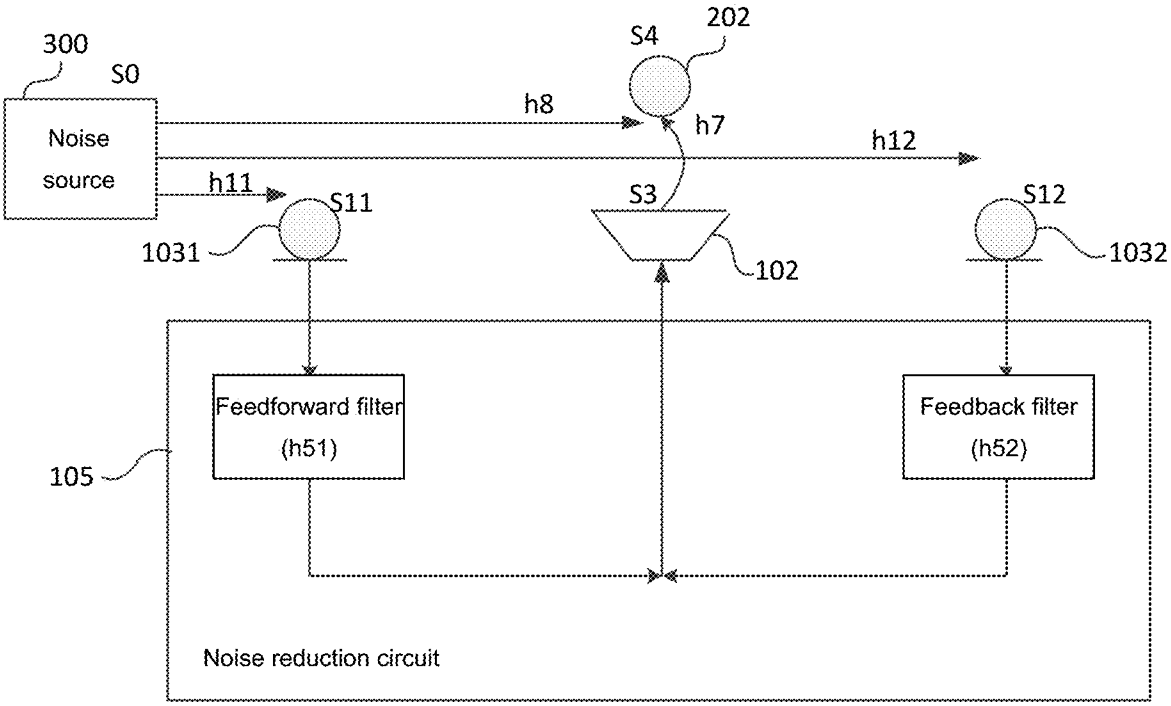
FIG. 13 is a schematic diagram of an active noise reduction principle of an acoustic device according to some exemplary embodiments of the present disclosure.

FIG. 13 is a schematic diagram of an active noise reduction principle of an acoustic device according to some exemplary embodiments of the present disclosure. As shown in FIG. 13, it is assumed that the first sound sensor module 103 includes a sound sensor 1031 and a sound sensor 1032, and that the noise reduction circuit includes a feedforward filter h51 and a feedforward filter h52. The feedforward filter h51 is connected to the sound sensor 1031 and the speaker 102. The feedforward filter h52 is connected to the sound sensor 1032 and the speaker 102.

With continued reference to FIG. 13, the following is assumed:

- a transfer function from a sound emitted by the noise source 300 to an audio signal measured by the sound sensor 1031 is denoted as h11;
- a transfer function from a sound emitted by the noise source 300 to an audio signal measured by the sound sensor 1032 is denoted as h12;
- an acoustic transfer function from a sound emitted by the speaker 102 to the eardrum 202 is denoted as h7; and
- an acoustic transfer function from a sound emitted by the noise source 300 to the eardrum 202 is denoted as h8.

A noise signal emitted by the noise source 300 is denoted as S0; an individual ambient noise signal captured by the sound sensor 1031 is denoted as S11; an individual ambient noise signal captured by the sound sensor 1032 is denoted as S12; a noise cancellation signal emitted by the speaker 102 is denoted as S3; and a noise signal received by the eardrum 202 is denoted as S4.

According to an acoustic transfer process shown in FIG. 13, the following relationships exist between S0, S11, S12, S3, and S4:

$$S4 = S0 * h8 + S3 * h7 \quad \text{formula (0)}$$

$$S3 = S11 * h51 + S12 * h52 \quad \text{formula (7)}$$

$$S11 = S0 * h11 \quad \text{formula (8)}$$

$$S12 = S0 * h12 \quad \text{formula (9)}$$

Substituting the formula (8) and the formula (9) into the formula (7) yields:

$$S3 = S0 * h11 * h51 + S0 * h12 * h52 \quad \text{formula (10)}$$

Substituting the formula (10) into the formula (0) yields:

$$S4 = S0 * h8 + S0 * (h11 * h51 + h12 * h52) * h7 \quad \text{formula (11)}$$

From the formula (11), it can be learned that the feedforward noise reduction effect is jointly determined by h51 and h52.

In some exemplary embodiments, when the noise reduction circuit 105 performs active noise reduction, the noise reduction circuit 105 may adjust a filter parameter of the feedforward filter h51 based on a weight of the sound sensor 1031, and filter, by using the adjusted feedforward filter h51, the individual ambient noise signal S11 captured by the sound sensor 1031, to generate an individual noise cancellation signal. In addition, the noise reduction circuit 105 may further adjust a filter parameter of the feedforward filter h52 based on a weight of the sound sensor 1032, and filter, by using the adjusted feedforward filter h52, the individual ambient noise signal S12 captured by the sound sensor 1032, to generate an individual noise cancellation signal. Further, the noise reduction circuit 105 combines the two individual noise cancellation signals generated by the two feedforward filters to obtain a first noise cancellation signal.

In some exemplary embodiments, the adjusting of the filter parameter of the feedforward filter h51 or the feedforward filter h52 may include: adjusting a filter gain of the feedforward filter h51 or the feedforward filter h52. For example, the adjusted filter gain of the feedforward filter h51 may be obtained by multiplying the weight of the sound sensor 1031 by a current filter gain of the feedforward filter h51. The adjusted filter gain of the feedforward filter h52 may be obtained by multiplying the weight of the sound sensor 1032 by a current filter gain of the feedforward filter h52.

It should be understood that the noise reduction circuit 105 adjusts filter parameters of N feedforward filters based on N weights, so that in the active noise reduction process, a sound sensor with a greater weight (a sound sensor with a higher phase lead) and a feedforward filter corresponding to the sound sensor have a higher contribution to overall noise reduction and that a sound sensor with a smaller weight (a sound sensor with a lower phase lead) and a feedforward filter corresponding to the sound sensor have a lower contribution to the overall noise reduction, thereby improving an effect of active noise reduction.

In some exemplary embodiments, the N sound sensors may be N directional microphones with different directivity. With continued reference to FIG. 13, it is assumed that the sound sensor 1031 is directed at the front of the user and that the sound sensor 1032 is directed at the rear of the user. When the ambient noise comes from the front of the user, the directivity of the two sound sensors makes h11 much larger than h12 (that is, h11>>h12). It can be learned from the formula (11) that the sound sensor 1031 plays a major role in the active noise reduction process. Therefore, the first sound sensor module 103 has a phase lead, and the effect of active noise reduction can be improved. When the ambient noise comes from the rear of the user, the directivity of the two sound sensors makes h11 much smaller than h12 (that is, h11<<h12). It can be learned from the formula (11) that the sound sensor 1032 plays a major role in the active noise reduction process. Therefore, the first sound sensor module 103 has a phase lead, and the effect of active noise reduction can be improved.

As can be learned, in a case where the N sound sensors have different directivity, the different directivity of the N sound sensors enables the active noise reduction process to automatically select an optimal sound sensor, and the phase lead of the first sound sensor module in every direction can be accomplished without adjusting the filter parameter of the feedforward filter.

S34. Send the first noise cancellation signal to the speaker, so that the speaker converts the first noise cancellation signal into a first noise cancellation audio to reduce volume of the ambient noise at the eardrum.

It should be understood that S31 to S34 describe the estimation of the direction of arrival of the full-band ambient noise and full-band active noise reduction performed based on the estimated target direction. In some exemplary embodiments, the noise reduction circuit 105 may further perform estimation in a subband when estimating the target direction. For example, the full band is divided into M subbands, and the ambient noise includes M pieces of subband noise corresponding to the M subbands. The noise reduction circuit 105 may estimate directions of arrival of the M pieces of subband noise for each subband. In this case, the target direction obtained in S31 includes M directions of arrival corresponding to the M subbands. It should be noted that division of the M subbands is not limited in the present disclosure. In some exemplary embodiments, the M subbands may include a low band (for example, 0 Hz to 150 Hz), a mid-band (for example, 150 Hz to 500 Hz), and a high band (for example, 500 Hz to 2000 Hz).

In some exemplary embodiments, the noise reduction circuit 105 may obtain the N individual ambient noise signals captured by the N sound sensors, and then estimate a direction of arrival of a jth subband in the following manner: separately extracting subband noise signals corresponding to the jth subband from the N individual ambient noise signals to obtain N subband noise signals corresponding to the jth subband, and performing DOA analysis on the N subband noise signals to obtain the direction of arrival corresponding to the jth subband, where j is any positive integer less than or equal to M.

After obtaining the M directions of arrival corresponding to the M subbands, the noise reduction circuit 105 may perform active noise reduction based on each subband separately. Specifically, for the jth subband, the noise reduction circuit 105 determines, based on the direction of arrival corresponding to the jth subband, N subband weights corresponding to the N sound sensors, so that a phase of an integrated subband noise signal measured by the first sound sensor module 103 based on the N subband weights is ahead of a phase of ambient noise of the jth subband reaching the sound output end of the speaker 102. The integrated subband noise signal is a signal obtained by performing weighted summation, based on the N subband weights, on the subband noise signals corresponding to the jth subband and captured by the N sound sensors. Further, the noise reduction circuit 105 generates, based on the subband noise signals corresponding to the jth subband and captured by the N sound sensors and the N subband weights, N individual subband noise cancellation signals corresponding to the jth subband. The noise reduction circuit superposes the N individual subband noise cancellation signals to obtain a subband noise cancellation signal corresponding to the jth subband, where j is any positive integer less than or equal to M. The noise reduction circuit 105 performs the foregoing process for the M subbands separately, to obtain M subband noise cancellation signals corresponding to the M subbands. Further, the noise reduction circuit 105 sends the M subband noise cancellation signals to the speaker 102, so that the speaker 102 converts the M subband noise cancellation signals into noise cancellation audios to reduce the volume of the ambient noise at the eardrum 202.

It should be understood that the active noise reduction process for each subband is similar to the foregoing active noise reduction process for the full band. Details are not described herein. It should be noted that each feedforward filter may include M filter units corresponding to the M subbands. When active noise reduction is performed for the jth subband, a filter parameter corresponding to a jth filter unit in the feedforward filter may be adjusted based on a weight. For example, a filter gain corresponding to the jth filter unit may be adjusted.

Figure 14:
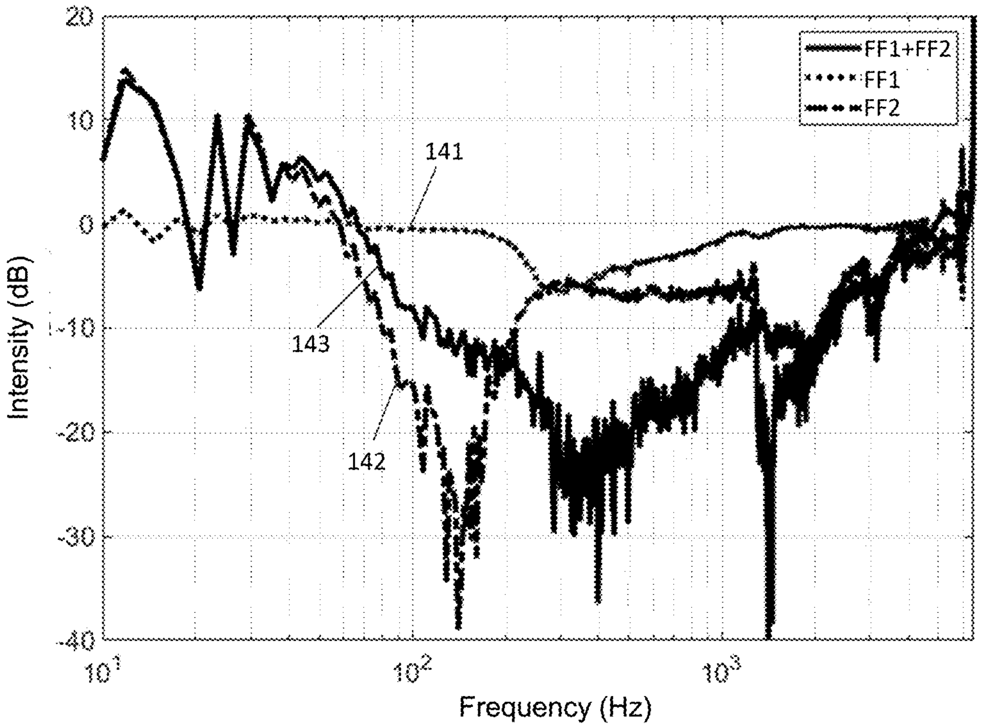
FIG. 14 is a schematic diagram of a group of frequency response curves according to some exemplary embodiments of the present disclosure.

FIG. 14 is a schematic diagram of a group of frequency response curves according to some exemplary embodiments of the present disclosure. As shown in FIG. 14, a curve 141 shows a frequency response of the acoustic device 100 using a single sound sensor FF1 with a feedforward filter, a curve 142 shows a frequency response of the acoustic device 100 using a single sound sensor FF2 with a feedforward filter, and a curve 143 shows a frequency response of the acoustic device 100 using both a sound sensor FF1 and a sound sensor FF2 with two parallel feedforward filters. From the curves 141 and 142, it can be learned that the single sound sensor FF1 and the single sound sensor FF2 respectively achieve noise reduction effects in different frequency bands. From the curve 143, it can be learned that a combination of the sound sensor FF1 and the sound sensor FF2 can achieve a noise reduction effect in a wider band and achieve a greater noise reduction depth.

Figure 15:
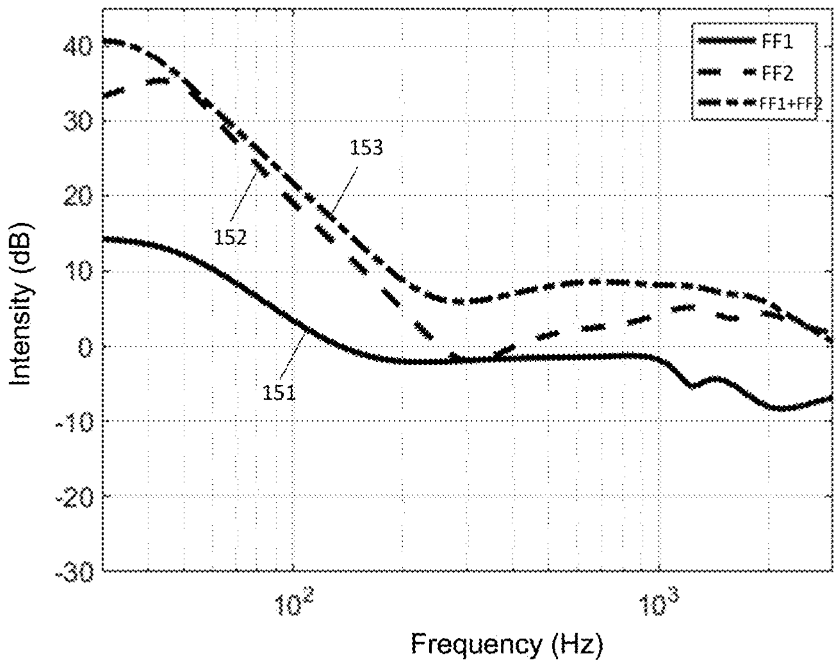
FIG. 15 is a schematic diagram of an group of frequency response curves according to some exemplary embodiments of the present disclosure.

As described above, in the open acoustic device, there is a leakage signal in the ambient noise signal captured by the sound sensor (that is, the leakage signals from the speaker 102). By using the plurality of sound sensors disposed in the first sound sensor 103, the acoustic device 100 can reduce the leakage to some extent. FIG. 15 is a schematic diagram of an group of frequency response curves according to some exemplary embodiments of the present disclosure. As shown in FIG. 15, a curve 153 shows a frequency response of the acoustic device 100 using both a sound sensor FF1 and a sound sensor FF2 with two parallel feedforward filters for noise reduction. A curve 151 shows a frequency response of FF1 and a feedforward filter corresponding to FF1. A curve 152 shows a frequency response of FF2 and a feedforward filter corresponding to FF2. As can be learned from FIG. 15, in a case where two sound sensors are used, a feedforward filter gain required by each sound sensor is significantly lower than that required by a single sound sensor to achieve the same filter effect. The reduction of the feedforward filter gain can reduce the leakage, thereby avoiding problems such as system divergence caused by the leakage and an increase of noise when some users wear the acoustic device.

In summary, in the active noise reduction method P300 provided in the present disclosure, in the case that the first sound sensor module 103 includes the N sound sensors, when performing active noise reduction, the noise reduction circuit 105 may determine, based on the target direction from which the ambient noise comes, the N weights corresponding to the N sound sensors, so that the phase of the integrated ambient noise signal measured by the first sound sensor module 103 based on the N weights is ahead of the phase of the ambient noise reaching the sound output end of the speaker. Then the noise reduction circuit 105 generates the first noise cancellation signal based on the N individual ambient noise signals captured by the N sound sensors and the N weights, and sends the first noise cancellation signal to the speaker 102. It can be learned that by introducing the N sound sensors and assigning the weights to the N sound sensors, regardless of the direction from which the ambient noise comes, the solution can ensure that the first sound sensor module 103 has a phase lead relative to the sound output end of the speaker 102, improve causality of feedforward noise reduction, further improve the effect of active noise reduction, and in particular, improve high-frequency noise reduction performance. In addition, in comparison with using a single sound sensor, using a plurality of sound sensors can further reduce the gain, thereby reducing leakage of some bands (such as a high frequency band) in an open scenario and avoiding problems such as system divergence caused by the leakage of the band and the increase of noise when some users wear the acoustic device. Further, by using the subband as a granularity to estimate the direction of arrival and performing active noise reduction for each subband separately, the solution helps increase the noise reduction depth for each subband, thereby further improving the effect of active noise reduction.

Usually, after an active noise reduction function is enabled, the acoustic device 100 performs active noise reduction within a range of the full band based on a pre-designed noise reduction parameter. However, in an actual application, the pre-designed noise reduction parameter is usually not applicable to active noise reduction in various external environments because the external environments of the acoustic device 100 are diverse. For example, the noise reduction effect of the acoustic device may be poor in some special external environments, or there may be a sound crack of the speaker 102.

Therefore, the noise reduction circuit 105 can provide a plurality of noise reduction modes. Therefore, in the active noise reduction process, the noise reduction circuit 105 can adaptively select a target noise reduction mode from the plurality of noise reduction modes based on a noise condition of an external environment, and execute the target noise reduction mode. Adaptively selecting the target noise reduction mode means that the noise reduction mode can be switched autonomously, flexibly, intelligently, and/or adaptively based on the noise condition of the external environment. It should be understood that the process of switching the noise reduction mode is performed automatically by the noise reduction circuit 105 without the user's manual participation.

In some exemplary embodiments, the plurality of noise reduction modes may include at least one of a passive noise reduction mode, an anti-cracking noise reduction mode, a narrowband noise reduction mode, or an ordinary noise reduction mode.

In the passive noise reduction mode, the active noise reduction function of the acoustic device 100 is disabled.

In the ordinary noise reduction mode, the active noise reduction function of the acoustic device 100 is enabled, and the noise reduction circuit 105 performs active noise reduction within the range of the full band based on at least one of the first sound signal or the second sound signal by using the pre-designed noise reduction parameter.

In the narrowband noise reduction mode, the active noise reduction function of the acoustic device 100 is enabled. The active noise reduction process includes: the noise reduction circuit 105 determines a target band based on the first sound signal, where an energy concentration in the target band exceeds a preset threshold. The energy concentration in the target band is a concentration of noise signal energy in the target band. In some exemplary embodiments, a corresponding bandwidth of the target band is less than a preset bandwidth. Therefore, the target band may be referred to as a narrow band. Further, the noise reduction circuit 105 may perform active noise reduction in the target band (narrow band) based on at least one of the first sound signal or the second sound signal.

In some exemplary embodiments, after the target band is determined, the noise reduction circuit 105 may adjust the noise reduction parameter of the noise reduction circuit 105 based on the target band, and the adjusted noise reduction parameter may specify that active noise reduction is focused on the target band (for example, a noise reduction depth of the target band is greater than that of any other band), or the adjusted noise reduction parameter may specify that active noise reduction is performed only for the target band and not for other bands. In some exemplary embodiments, the adjusting of the noise reduction parameter of the noise reduction circuit 105 may include: converting a full-band filter in the noise reduction circuit 105 into a narrowband filter. By adjusting the noise reduction parameter based on the target band, the foregoing embodiment can increase the noise reduction depth of the target band and improve the noise reduction effect in the target band.

In the anti-cracking noise reduction mode, the active noise reduction function of the acoustic device 100 is enabled. The active noise reduction process includes: the noise reduction circuit 105 generates a noise cancellation signal based on at least one of the first sound signal or the second sound signal and makes an amplitude of the noise cancellation signal within an amplitude range supported by the speaker 102. Further, the noise reduction circuit 105 sends the noise cancellation signal to the speaker 102, so that the speaker 102 converts the noise cancellation signal into a noise cancellation audio to reduce the volume of the ambient noise at the eardrum 202. The amplitude range is an amplitude range of a signal that the speaker 102 supports playing without a sound crack (broken sound) when the speaker 102 emits a sound. The sound crack is a phenomenon of severe sound distortion caused by vibration of a speaker diaphragm beyond its linear range. When an amplitude of a signal input to the speaker 102 exceeds the amplitude range, a sound crack is caused in the speaker 102. When an amplitude of a signal input to the speaker 102 is within the amplitude range, no sound crack is caused in the speaker 102. It should be understood that because the noise reduction circuit 105 ensures that the amplitude of the noise cancellation signal is within the amplitude range supported by the speaker 102 during generation of the noise cancellation signal, a sound crack can be avoided in the speaker 102.

In some exemplary embodiments, the noise reduction circuit 105 may generate the noise cancellation signal in the following manner, so that the amplitude of the noise cancellation signal is within the amplitude range supported by the speaker 102: The noise reduction circuit 105 filters at least one of the first sound signal or the second sound signal to obtain a candidate noise cancellation signal. The filtering process has been described in the related part above, and is not described herein again. Further, the noise reduction circuit 105 corrects an amplitude of the candidate noise cancellation signal based on the amplitude range, so that the corrected amplitude is within the amplitude range, and the corrected signal is used as the noise cancellation signal. In some exemplary embodiments, a dynamic range control (dynamic range control, DRC) may be disposed at an output end of the noise reduction circuit 105 (that is, an interface between the noise reduction circuit 105 and the speaker 102). The dynamic range control is configured to adjust the amplitude of the input signal, so that an amplitude of an output signal is within the amplitude range. In this case, after obtaining the candidate noise cancellation signal, the noise reduction circuit 105 inputs the candidate noise cancellation signal into the dynamic range control, and the dynamic range control corrects the amplitude of the candidate noise cancellation signal to obtain the noise cancellation signal.

In this manner, the noise reduction circuit 105 does not need to adjust the original noise reduction parameter, and only a post amplitude correction step is added (for example, the dynamic range control is added), to avoid a sound crack in the speaker 102.

In some exemplary embodiments, the noise reduction circuit 105 may generate the noise cancellation signal in the following manner, so that the amplitude of the noise cancellation signal is within the amplitude range supported by the speaker 102: The noise reduction circuit 105 adjusts, based on the first sound signal, the filter gain corresponding to the noise reduction circuit 105, so that the amplitude of the filtered output signal is within the amplitude range. Further, based on the adjusted noise reduction parameter, the noise reduction circuit 105 filters at least one of the first sound signal or the second sound signal to obtain the noise cancellation signal.

In this manner, the noise reduction circuit 105 only needs to adjust the filter gain to make the amplitude of the noise cancellation signal within the amplitude range, without changing a circuit structure of the noise reduction circuit 105.

In some exemplary embodiments, in the adjusted filter gain, the first filter gain corresponding to the first preset band is less than the second filter gain corresponding to the second preset band. In some exemplary embodiments, a frequency in the first preset band is lower than a frequency in the second preset band. In some exemplary embodiments, the frequency in the first preset band is lower than a preset frequency, and the preset frequency may be 500 Hz, 200 Hz, 150 Hz, or any other frequency value. In some exemplary embodiments, the first preset band may be a low band (for example, a band whose frequencies are lower than 150 Hz). Because the first preset band corresponds to a small filter gain, the amplitude corresponding to the filtered noise cancellation signal in the first preset band is small, and a sound crack in the first preset band can be avoided in the speaker 102.

In some exemplary embodiments, when adjusting the filter gain, the noise reduction circuit 105 may reduce the first filter gain corresponding to the first preset band on a basis of the default filter gain, while keeping the second filter gain corresponding to the second preset band unchanged. In this way, a sound crack can be avoided in the speaker 102 without reducing the noise reduction effect corresponding to the second preset band.

In a case where the acoustic device 100 provides a plurality of noise reduction modes, the present disclosure provides an active noise reduction method P400, which can adaptively switch to a noise reduction mode suitable for a current environment based on a noise condition of the current environment, so that the acoustic device 100 can have good noise reduction effects in different environments. The active noise reduction method P400 may be applied independently to the acoustic device 100 provided in the present disclosure, or may be combined with other active noise reduction methods described in other parts of the present disclosure.

Figure 16:
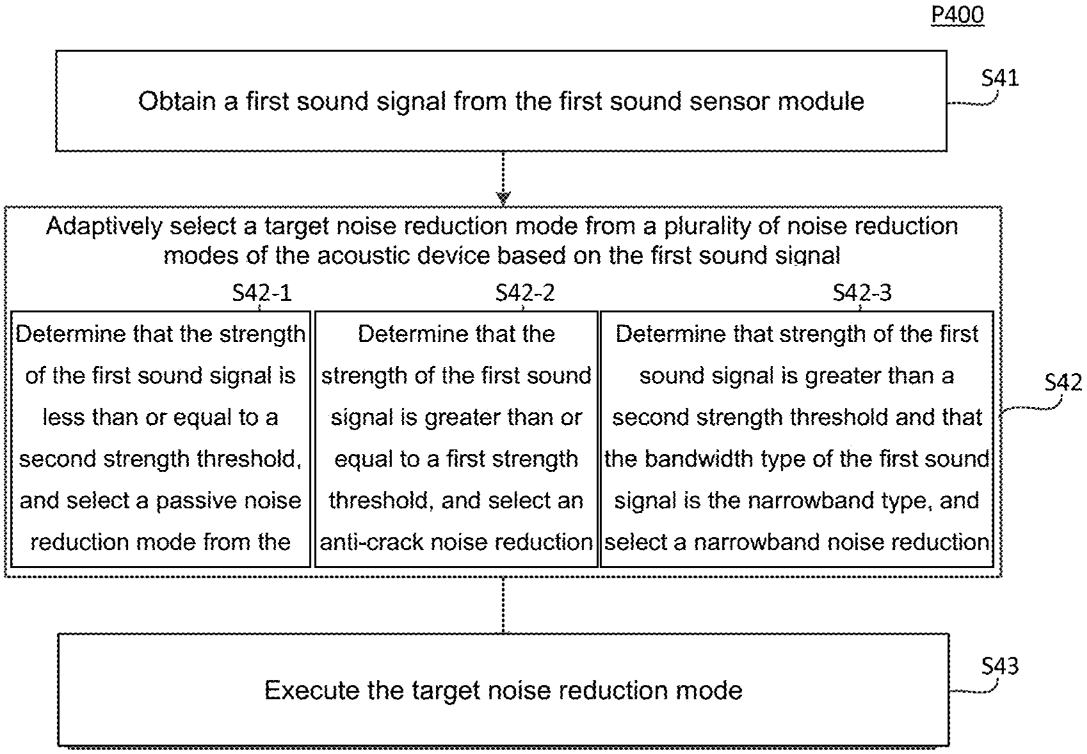
FIG. 16 is a flowchart of an active noise reduction method according to some exemplary embodiments of the present disclosure.

FIG. 16 is a flowchart of an active noise reduction method P400 according to some exemplary embodiments of the present disclosure. The active noise reduction method P400 may be performed by the noise reduction circuit 105 in the acoustic device 100. For example, the processor 107 in the noise reduction circuit 105 may read an instruction set stored in the local storage medium of the noise reduction circuit 105 and then perform, as instructed by the instruction set, the active noise reduction method P400 described in the present disclosure. As shown in FIG. 16, the active noise reduction method P400 may include the following steps.

S41. Obtain a first sound signal from the first sound sensor module.

S42. Adaptively select a target noise reduction mode from a plurality of noise reduction modes of the acoustic device based on the first sound signal.

In some exemplary embodiments, the noise reduction circuit 105 may adaptively select the target noise reduction mode from the plurality of noise reduction modes based on at least one of strength or a bandwidth type of the first sound signal. The bandwidth type of the first sound signal may be classified into the following two types: a narrowband type and a non-narrowband type. The narrowband type indicates that a bandwidth occupied by the first sound signal is less than a preset bandwidth. In comparison with the non-narrowband type, signal energy of the narrowband type is concentrated within a narrow band range.

In some exemplary embodiments, the process of adaptively selecting the target noise reduction mode by the noise reduction circuit 105 may include at least one of the following S42-1, S42-2, and S42-3.

S42-1. Determine that the strength of the first sound signal is less than or equal to a second strength threshold, and select a passive noise reduction mode from the plurality of noise reduction modes.

The second strength threshold may correspond to an upper limit of noise strength in a silent environment. For example, the second strength threshold may be 40 dB. In other words, when noise strength of the external environment is small (for example, less than 40 dB), the noise reduction circuit 105 selects the passive noise reduction mode and disables an active noise reduction function. In this way, power consumption of the acoustic device 100 can be reduced.

S42-2. Determine that the strength of the first sound signal is greater than or equal to a first strength threshold, and select an anti-cracking noise reduction mode from the plurality of noise reduction modes.

The first strength threshold is greater than the second strength threshold. For example, the first strength threshold may be 90 dB. When noise of the external environment is high (for example, greater than or equal to 90 dB), the noise reduction circuit 105 may select the anti-cracking noise reduction mode. In this way, a sound crack in the speaker 102 can be avoided.

S42-3. Determine that strength of the first sound signal is greater than a second strength threshold and that the bandwidth type of the first sound signal is the narrowband type, and select a narrowband noise reduction mode from the plurality of noise reduction modes.

That the strength of the first sound signal is greater than the second strength threshold is a condition for enabling the active noise reduction function. On this basis, if the bandwidth type of the first sound signal is the narrowband type, the noise reduction circuit 105 selects the narrowband noise reduction mode. In this way, active noise reduction can be performed only for the target band in which energy of the first sound signal is concentrated, rather than in the full band. This helps increase a noise reduction depth in the target band and improve an effect of active noise reduction.

In some exemplary embodiments, determining logic of the noise reduction circuit 105 to adaptively select the target noise reduction mode may be as follows: The noise reduction circuit 105 first determines whether the strength of the first sound signal is less than the second strength threshold, and if yes, selects the passive noise reduction mode, or if no, enables the active noise reduction function. Then the noise reduction circuit 105 separately determines whether the following two conditions are satisfied: Condition 1: The strength of the first sound signal is greater than or equal to the first strength threshold. Condition 2: The bandwidth type of the first sound signal is the narrowband type. In this case, a determining result includes the following four cases: If only the condition 1 is satisfied, the anti-cracking noise reduction mode is selected; if only the condition 2 is satisfied, the narrowband noise reduction mode is selected; if the condition 1 and the condition 2 are both satisfied, both the anti-cracking noise reduction mode and the narrowband noise reduction mode may be selected; or if neither of the condition 1 and the condition 2 is satisfied, an ordinary noise reduction mode is selected.

In some exemplary embodiments, when the first sound signal includes both an ambient noise signal and a leakage signal, the noise reduction circuit 105 may first generate a quasi-ambient noise signal by reducing components of the leakage signal in the first sound signal, and then adaptively select the target noise reduction mode from the plurality of noise reduction modes based on the quasi-ambient noise signal. A manner of reducing the components of the leakage signal in the first sound signal has been described above, and is not described herein again.

By reducing the components of the leakage signal in the first sound signal, the noise reduction circuit 105 makes the obtained quasi-ambient noise signal closer to actual ambient noise. Therefore, the target noise reduction mode is selected adaptively based on the quasi-ambient noise signal, the selected target noise reduction mode is more compliant with the current environment, and the noise reduction effect is improved.

S43. Execute the target noise reduction mode.

In some exemplary embodiments, the acoustic device 100 works in a feedforward noise reduction mode, and the noise reduction circuit 105 executes the target noise reduction mode based on the first sound signal. In some exemplary embodiments, the acoustic device 100 works in a feedback noise reduction mode, and the noise reduction circuit 105 executes the target noise reduction mode based on a second sound signal. In some exemplary embodiments, the acoustic device 100 works in a hybrid noise reduction mode, and the noise reduction circuit 105 executes the target noise reduction mode based on the first sound signal and the second sound signal.

In summary, the active noise reduction method P400 provided in the present disclosure can adaptively adjust the noise reduction mode based on the noise condition of the external environment of the acoustic device 100, so that the active noise reduction process of the acoustic device 100 is more compliant with the noise condition of the current environment. This helps improve overall performance of the acoustic device 100. For example, when the noise in the current environment is low, the acoustic device 100 may disable the active noise reduction function to reduce power consumption; when the noise in the current environment is high, the acoustic device 100 may select the anti-cracking noise reduction mode to avoid a sound crack in the speaker 102; or when the noise in the current environment is of the narrowband type, the acoustic device 100 may select the narrowband noise reduction mode to increase the noise reduction depth and improve the noise reduction effect.

In a case where the acoustic device 100 provides a plurality of noise reduction modes, the present disclosure further provides an active noise reduction method. The active noise reduction method may be performed by the noise reduction circuit 105. In the active noise reduction method, the noise reduction circuit 105 may obtain a user's instruction, select a target noise reduction mode from the plurality of noise reduction modes according to the user's instruction, and then execute the target noise reduction mode. For example, an interactive control may be provided on the acoustic device 100, and the user may switch between different noise reduction modes by operating the interactive control. In another example, the acoustic device 100 may provide an interactive interface, and the interactive interface may be presented on a screen of the acoustic device 100 or presented on a target device communicatively connected to the acoustic device 100. The user may select different noise reduction modes by using the interactive interface. In some exemplary embodiments, the user's instruction may indicate a specific noise reduction mode, so that the noise reduction circuit 105 can determine the noise reduction mode indicated by the instruction as the target noise reduction mode. In some exemplary embodiments, the user's instruction may specifically indicate an ambient noise condition of the user, and the noise reduction circuit 105 may select the target noise reduction mode from the plurality of noise reduction modes based on the ambient noise condition indicated by the instruction. In this way, the user can independently select a suitable active noise reduction mode based on the user's preference and/or a current ambient noise condition, and individual requirements of different users can be satisfied.

Another aspect of the present disclosure provides a non-transitory storage medium. The non-transitory storage medium stores at least one group of executable instructions for performing active noise reduction. When the executable instructions are executed by a processor, the executable instructions instruct the processor to implement steps of the active noise reduction method described in the present disclosure. In some possible implementations, each aspect of the present disclosure may be further implemented in a form of a program product, where the program product includes program code. When the program product runs on the acoustic device 100, the program code is used to enable the acoustic device 100 to perform the steps of the active noise reduction method described in the present disclosure. The program product for implementing the foregoing method may use a portable compact disc read-only memory (CD-ROM) including program code, and can run on the acoustic device 100. However, the program product in the present disclosure is not limited thereto. In the present disclosure, a readable storage medium may be any tangible medium containing or storing a program, and the program may be used by or in connection with an instruction execution system. The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, apparatus, or device, or any combination thereof. More specific examples of the readable storage medium include: an electrical connection having one or more conducting wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. The computer-readable storage medium may include a data signal propagated in a baseband or as part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program to be used by or in combination with an instruction execution system, apparatus, or device. The program code contained in the readable storage medium may be transmitted by using any appropriate medium, including but not limited to wireless, wired, optical cable, RF, or the like, or any appropriate combination thereof. The program code for performing operations in the present disclosure may be compiled in any combination of one or more programming languages. The programming languages include object-oriented programming languages such as Java and C++, and further include conventional procedural programming languages such as a "C" language or a similar programming language. The program code may be fully executed on the acoustic device 100, partially executed on the acoustic device 100, executed as an independent software package, partially executed on the acoustic device 100 and partially executed on a remote computing device, or fully executed on a remote computing device.

Specific embodiments of the present disclosure are described above. Other embodiments also fall within the scope of the appended claims. In some situations, the actions or steps described in the claims can be implemented in an order different from the order in the exemplary embodiments and the expected results can still be achieved. In addition, the processes depicted in the drawings do not necessarily require a specific order or sequence to achieve the expected results. In some implementations, multitask processing and parallel processing are also possible or may be advantageous.

In summary, after reading this detailed disclosure, a person skilled in the art may understand that the foregoing detailed disclosure may be presented by using examples only, and may not be restrictive. A person skilled in the art may understand that the present disclosure is intended to cover various reasonable changes, improvements, and modifications to the exemplary embodiments, although this is not stated herein. These changes, improvements, and modifications are intended to be made in the present disclosure and are within the spirit and scope of the exemplary embodiments of the present disclosure.

In addition, some terms in the present disclosure have been used to describe the exemplary embodiments of the present disclosure. For example, "one embodiment", "an embodiment", and/or "some exemplary embodiments" mean/means that a specific feature, structure, or characteristic described with reference to the embodiment(s) may be included in at least one embodiment of the present disclosure. Therefore, it can be emphasized and should be understood that in various parts of the present disclosure, two or more references to "an embodiment" or "one embodiment" or "an alternative embodiment" do not necessarily all reference may be made to the same embodiment. Further, specific features, structures, or characteristics may be appropriately combined in one or more embodiments of the present disclosure.

It should be understood that in the foregoing description of the exemplary embodiments of the present disclosure, to help understand one feature and for the purpose of simplifying the present disclosure, various features in the present disclosure are combined in a single embodiment, single drawing, or description thereof. However, this does not mean that the combination of these features is necessary. It is entirely possible for a person skilled in the art to mark out some of the devices as a separate embodiment for understanding when reading the present disclosure. In other words, an embodiment of the present disclosure may also be understood as the integration of a plurality of sub-embodiments. It is also true when content of each sub-embodiment is less than all features of a single embodiment disclosed above.

Each patent, patent application, patent application publication, and other materials cited herein, such as articles, books, specifications, publications, documents, and materials, can be incorporated herein by reference, which are applicable to all content used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistency or conflict in descriptions, definitions, and/or use of a term associated with this document and descriptions, definitions, and/or use of the term associated with any material, the term in this document shall prevail.

Finally, it should be understood that the implementation solutions of the present disclosure disclosed herein illustrate the principles of the implementation solutions of the present disclosure. Other modified embodiments also fall within the scope of the present disclosure. Therefore, the exemplary embodiments disclosed in the present disclosure are merely exemplary and not restrictive. A person skilled in the art may use alternative configurations to implement the application in the present disclosure according to the exemplary embodiments of the present disclosure. Therefore, the embodiments of the present disclosure are not limited to those embodiments precisely described in the present disclosure.

What is claimed is:

1. An acoustic device, comprising:

a support member;

a speaker, physically connected to the support member, wherein an open space in air communication with an exterior of an ear canal of a user is formed between the speaker and an eardrum of the user when the acoustic device is worn on the user's head;

a first sound sensor module, physically connected to the support member, and configured to capture a first sound and generate a first sound signal, wherein the first sound signal includes an ambient noise signal from ambient noise; and a noise reduction circuit, configured to:

obtain the first sound signal from the first sound sensor module, adaptively select a target noise reduction mode from a plurality of noise reduction modes based on a noise condition of the ambient noise reflected by the first sound signal, and execute the target noise reduction mode.

2. The acoustic device according to claim 1, further comprising:

a second sound sensor module physically connected to the support member, and configured to capture a second sound and generate a second sound signal, wherein to execute the target noise reduction mode, the noise reduction circuit is configured to:

obtain the second sound signal from the second sound sensor module, and execute the target noise reduction mode for at least one of the first sound signal or the second sound signal.

3. The acoustic device according to claim 2, wherein the first sound sensor module is farther away from the eardrum than the speaker; and the second sound sensor module is closer to the eardrum than the speaker.

4. The acoustic device according to claim 2, wherein the plurality of noise reduction modes includes an anti-clipping noise reduction mode;

in the anti-clipping noise reduction mode, the noise reduction circuit is configured to:

generate a noise cancellation signal based on at least one of the first sound signal or the second sound signal, wherein an amplitude of the noise cancellation signal is within an amplitude range supported by the speaker, and send the noise cancellation signal to the speaker to enable the speaker to convert the noise cancellation signal into a noise cancellation audio, so as to reduce volume of ambient noise at the eardrum; and to adaptively select the target noise reduction mode, the noise reduction circuit is configured to:

determine that a strength of the first sound signal is greater than or equal to a first strength threshold, and select the anti-clipping noise reduction mode from the plurality of noise reduction modes.

5. The acoustic device according to claim 4, wherein to generate the noise cancellation signal, the noise reduction circuit is configured to:

filter at least one of the first sound signal or the second sound signal to obtain a candidate noise cancellation signal;

correct an amplitude of the candidate noise cancellation signal based on the amplitude range to obtain a corrected signal with a corrected amplitude within the amplitude range; and use the corrected signal as the noise cancellation signal.

6. The acoustic device according to claim 4, wherein to generate the noise cancellation signal, the noise reduction circuit is configured to:

adjust, based on the first sound signal, a filter gain corresponding to the noise reduction circuit, so that an amplitude of a filtered output signal is within the amplitude range; and filter at least one of the first sound signal or the second sound signal based on the adjusted filter gain to obtain the noise cancellation signal.

7. The acoustic device according to claim 6, wherein in the adjusted filter gain, a first filter gain corresponding to a first preset band is less than a second filter gain corresponding to a second preset band;

a frequency in the first preset band is lower than a preset frequency; and a frequency in the second preset band is higher than or equal to the preset frequency.

8. The acoustic device according to claim 2, wherein the plurality of noise reduction modes includes a narrowband noise reduction mode;

in the narrowband noise reduction mode, the noise reduction circuit is configured to:

determine a target band based on the first sound signal, wherein an energy concentration in the target band exceeds a preset threshold, and perform active noise reduction in the target band based on at least one of the first sound signal or the second sound signal; and to adaptively select the target noise reduction mode, the noise reduction circuit is configured to:

determine that a strength of the first sound signal is greater than a second strength threshold, determine that a type of the first sound signal is a narrowband type, and select the narrowband noise reduction mode from the plurality of noise reduction modes.

9. The acoustic device according to claim 2, wherein the plurality of noise reduction modes includes a passive noise reduction mode;

in the passive noise reduction mode, the noise reduction circuit disables an active noise reduction function; and to adaptively select the target noise reduction mode, the noise reduction circuit is configured to:

determine that a strength of the first sound signal is less than or equal to a second strength threshold, and select the passive noise reduction mode from the plurality of noise reduction modes.

10. The acoustic device according to claim 1, wherein the first sound signal further includes a leakage signal from the speaker; and to adaptively select the target noise reduction mode, the noise reduction circuit is configured to:

generate a quasi-ambient noise signal by reducing components of the leakage signal in the first sound signal, and adaptively selects the target noise reduction mode from the plurality of noise reduction modes based on the quasi-ambient noise signal.

11. The acoustic device according to claim 1, wherein the acoustic device is at least one of an earphone, a muffler, a hearing aid, or acoustic glasses.

12. An active noise reduction method for an acoustic device, wherein the acoustic device includes:

a support member, a speaker, physically connected to the support member, wherein an open space in air communication with an exterior of an ear canal of a user is formed between the speaker and an eardrum of the user when the acoustic device is worn on the user's head, a first sound sensor module, physically connected to the support member, and configured to capture a first sound and generate a first sound signal, wherein the first sound signal includes an ambient noise signal from ambient noise, and a noise reduction circuit;

the method comprising the following steps performed by the noise reduction circuit:

obtaining the first sound signal from the first sound sensor module;

adaptively selecting the target noise reduction mode from the plurality of noise reduction modes based on a noise condition of the ambient noise reflected by the first sound signal; and executing the target noise reduction mode.

13. The method according to claim 12, wherein the acoustic device further includes a second sound sensor module physically connected to the support member, and configured to capture a second sound and generate a second sound signal; and the executing of the target noise reduction mode includes:

obtaining the second sound signal from the second sound sensor module, and executing the target noise reduction mode for at least one of the first sound signal or the second sound signal.

14. The method according to claim 13, wherein the plurality of noise reduction modes includes an anti-clipping noise reduction mode;

the adaptively selecting of the target noise reduction mode from the plurality of noise reduction modes based on the first sound signal includes:

determining that a strength of the first sound signal is greater than or equal to a first strength threshold, and selecting the anti-clipping noise reduction mode from the plurality of noise reduction modes; and executing the anti-clipping noise reduction mode includes:

generating a noise cancellation signal based on at least one of the first sound signal or the second sound signal, wherein an amplitude of the noise cancellation signal is within an amplitude range supported by the speaker, and sending the noise cancellation signal to the speaker to enable the speaker to convert the noise cancellation signal into a noise cancellation audio, so as to reduce volume of ambient noise at the eardrum.

15. The method according to claim 14, wherein the generating of the noise cancellation signal includes:

filtering at least one of the first sound signal or the second sound signal to obtain a candidate noise cancellation signal;

correcting an amplitude of the candidate noise cancellation signal based on the amplitude range to obtain a corrected signal with a corrected amplitude within the amplitude range; and using the corrected signal as the noise cancellation signal.

16. The method according to claim 14, wherein the generating of the noise cancellation signal includes:

adjusting, based on the first sound signal, a filter gain corresponding to the noise reduction circuit, so that an amplitude of a filtered output signal is within the amplitude range; and filtering at least one of the first sound signal or the second sound signal based on the adjusted filter gain to obtain the noise cancellation signal.

17. The method according to claim 16, wherein in the adjusted filter gain:

a first filter gain corresponding to a first preset band is less than a second filter gain corresponding to a second preset band;

a frequency in the first preset band is lower than a preset frequency; and a frequency in the second preset band is higher than or equal to the preset frequency.

18. The method according to claim 13, wherein the plurality of noise reduction modes includes a narrowband noise reduction mode;

the adaptively selecting of the target noise reduction mode from the plurality of noise reduction modes based on the first sound signal includes:

determining that a strength of the first sound signal is greater than a second strength threshold, determining that a type of the first sound signal is a narrowband type, and selecting the narrowband noise reduction mode from the plurality of noise reduction modes; and executing the narrowband noise reduction mode includes:

determining a target band based on the first sound signal, wherein an energy concentration in the target band exceeds a preset threshold, and performing active noise reduction in the target band based on at least one of the first sound signal or the second sound signal.

19. The method according to claim 13, wherein the plurality of noise reduction modes includes a passive noise reduction mode;

the adaptively selecting of the target noise reduction mode from the plurality of noise reduction modes based on the first sound signal includes:

determining that a strength of the first sound signal is less than or equal to a second strength threshold, and selecting the passive noise reduction mode from the plurality of noise reduction modes; and executing the passive noise reduction mode includes:

disabling an active noise reduction function.

20. The method according to claim 12, wherein the first sound signal further includes a leakage signal from the speaker; and the adaptively selecting of the target noise reduction mode from the plurality of noise reduction modes based on the first sound signal includes:

generating a quasi-ambient noise signal by reducing components of the leakage signal in the first sound signal, and adaptively selecting the target noise reduction mode from the plurality of noise reduction modes based on the quasi-ambient noise signal.

* * * * *